(12) United States Patent
Menon et al.

(10) Patent No.: US 11,300,449 B2
(45) Date of Patent: Apr. 12, 2022

(54) IMAGING DEVICE WITH IMAGE DISPERSING TO CREATE A SPATIALLY CODED IMAGE

(71) Applicant: University of Utah Research Foundation, Salt Lake City, UT (US)

(72) Inventors: Rajesh Menon, Salt Lake City, UT (US); Peng Wang, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 112 days.

(21) Appl. No.: 15/560,958

(22) PCT Filed: Mar. 24, 2016

(86) PCT No.: PCT/US2016/024029
§ 371 (c)(1),
(2) Date: Sep. 22, 2017

(87) PCT Pub. No.: WO2016/154445
PCT Pub. Date: Sep. 26, 2016

(65) Prior Publication Data
US 2018/0052050 A1 Feb. 22, 2018

Related U.S. Application Data

(60) Provisional application No. 62/251,010, filed on Nov. 4, 2015, provisional application No. 62/137,702, filed on Mar. 24, 2015.

(51) Int. Cl.
*G01J 3/28* (2006.01)
*G01J 3/18* (2006.01)
(Continued)

(52) U.S. Cl.
CPC ........... *G01J 3/2823* (2013.01); *G01J 3/0208* (2013.01); *G01J 3/18* (2013.01); *G01J 3/36* (2013.01);
(Continued)

(58) Field of Classification Search
CPC .......... G01J 3/2823; G01J 3/0208; G01J 3/18; G01J 3/36; G01J 3/513; G01J 2003/2826;
(Continued)

(56) References Cited

U.S. PATENT DOCUMENTS

| 5,046,827 A | 9/1991 | Frost et al. |
| 5,237,452 A | 8/1993 | Okayama |

(Continued)

FOREIGN PATENT DOCUMENTS

| CN | 103261782 A | 8/2013 |
| EP | 0674190 A1 | 9/1995 |

(Continued)

OTHER PUBLICATIONS

Lyons; "A Diffractive Optic Image Spectrometer (DOIS);" In-House Report; (Oct. 1997); 162 pages; RL-TR-97-147.
(Continued)

*Primary Examiner* — Georgia Y Epps
*Assistant Examiner* — Don J Williams
(74) *Attorney, Agent, or Firm* — Thorpe North & Western

(57) ABSTRACT

An image capturing device (202) can include a sensor array (210), a lens (230) positioned at a first distance from an intermediate image (235), and apolychromat (220) positioned at a second distance from the lens (230). The polychromat (220) can diffract the intermediate image (235) according to a transform function (207) to produce a dispersed sensor image (215) onto the sensor array (210). The
(Continued)

dispersed sensor image (215) can represent a spatial code of the intermediate image (235).

28 Claims, 28 Drawing Sheets

(51) Int. Cl.
*G01J 3/02* (2006.01)
*G01J 3/36* (2006.01)
*G01J 3/51* (2006.01)
*H04N 9/04* (2006.01)
*H04N 5/225* (2006.01)

(52) U.S. Cl.
CPC ............ *G01J 3/513* (2013.01); *H04N 5/2254* (2013.01); *H04N 9/04557* (2018.08); *G01J 2003/284* (2013.01); *G01J 2003/2826* (2013.01); *H04N 9/04515* (2018.08)

(58) Field of Classification Search
CPC .. G01J 2003/284; H04N 5/2254; H04N 9/045
See application file for complete search history.

(56) References Cited

U.S. PATENT DOCUMENTS

| | | | |
|---|---|---|---|
| 6,101,034 A | | 8/2000 | Cox et al. |
| 6,781,701 B1 | | 8/2004 | Sweetser et al. |
| 7,031,054 B2 | | 4/2006 | Cathey, Jr. et al. |
| 7,894,058 B2 | | 2/2011 | Wilson et al. |
| 2003/0138206 A1* | | 7/2003 | Sheng ............... G02B 6/02085 385/37 |
| 2009/0180115 A1 | | 7/2009 | Wilson et al. |
| 2010/0309467 A1* | | 12/2010 | Fox ........................... G01J 3/02 356/326 |
| 2012/0200854 A1* | | 8/2012 | Bland-Hawthorn ...... G01J 3/02 356/328 |
| 2013/0050488 A1 | | 2/2013 | Brouard et al. |
| 2013/0208273 A1* | | 8/2013 | Dominguez-Caballero ............... G02B 27/1013 356/311 |
| 2014/0152839 A1* | | 6/2014 | Menon ................... H04N 5/332 348/164 |
| 2015/0032402 A1* | | 1/2015 | Menon ................. G01J 3/2823 702/104 |

FOREIGN PATENT DOCUMENTS

| | | |
|---|---|---|
| EP | 2631619 A1 | 8/2013 |
| JP | S55146405 | 11/1980 |
| JP | H07234309 A | 9/1995 |
| JP | 2008545974 A | 12/2008 |
| JP | 2013104789 A | 5/2013 |
| WO | WO 2005/069216 A1 | 7/2005 |
| WO | WO 2012047483 A2 | 4/2012 |
| WO | WO 2013/129921 A | 9/2013 |

OTHER PUBLICATIONS

Wang et al.; "Hyper-Spectral Imaging in Scanning-Confocal-Fluorescence Microscopy;" Optics Communications; (Mar. 28, 2014); pp. 73-80; vol. 324; <doi: 10.1016/j.optcom.2014.03.044 >.

Harvey et al.; "Spectral Imaging In a Snapshot." Progress in Biomedical Optics and Imaging; 2005; vol. 5694; pp. 110-119.

Kim et al.; "Point Light Source Integral Imaging With Improved Resolution and Viewing Angle by The Use of Electrically Movable Pinhole Array." Optics Express; OSA Publishing; Dec. 24, 2007; vol. 15, Issue 26; 15 Pages.

Kress et al.; "Rigorous Theory of Diffraction." Appendix A; Applied Digital Optics: From Micro-Optics to Nanophotonics; Oct. 26, 2009; pp. 583-586.

Lizuka et al.; "Derivation of The Fresnel-Kirchhoff Diffraction Formula From The Rayleigh-Sommerfeld Diffraction Formula." Elements of Photonics; Wiley; Apr. 26, 2002; vol. 1: In Free Space and Special Media; pp. 545-546.

PCT Application No. PCT/US2016/024029; Filing date Mar. 24, 2016, Rajesh Menon, International Search Report, Mailing Date Jun. 17, 2016, 10 Pages.

Wang et al.; "Computational Spectrometer Based on a Broadband Diffractive Optic." Optics Express; OSA Publishing; Jun. 5, 2014; vol. 22, Issue 12; pp. 14575-14587.

Wang et al.; "Computational Spectroscopy via Singular-Value Decomposition and Regularization." Optics Express; OSA Publishing; Aug. 28, 2014; vol. 22, Issue 18; pp. 21541-21550.

Yu et al.; "Transmissive/Reflective Structural Color Filters: Theory and Applications." Journal of Nanomaterials; Hindawi; Jul. 15, 2014; vol. 2014; 18 Pages.

Wang et al.; "Ultra-High-Sensitivity Color Imaging via a Transparent Diffractive-Filter Array and Computational Optics;" Optica; (Nov. 2015); pp. 933-939; vol. 2, No. 11; <doi: 10.1364/OPTICA.2.000933 >.

* cited by examiner

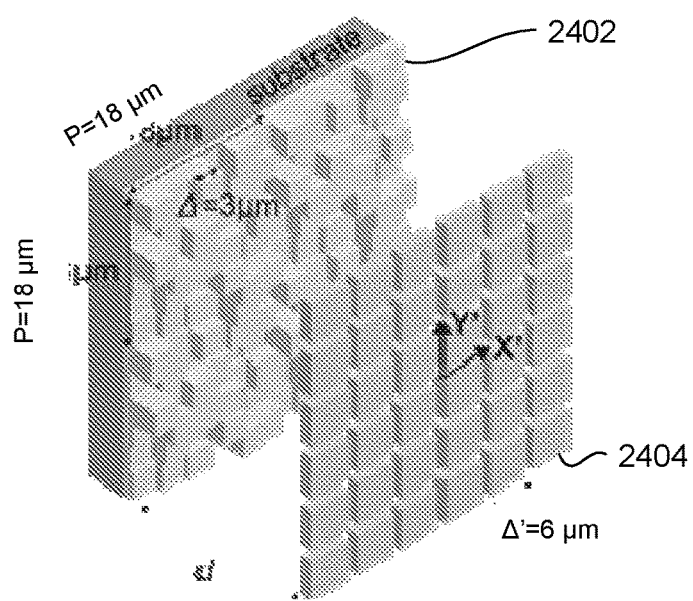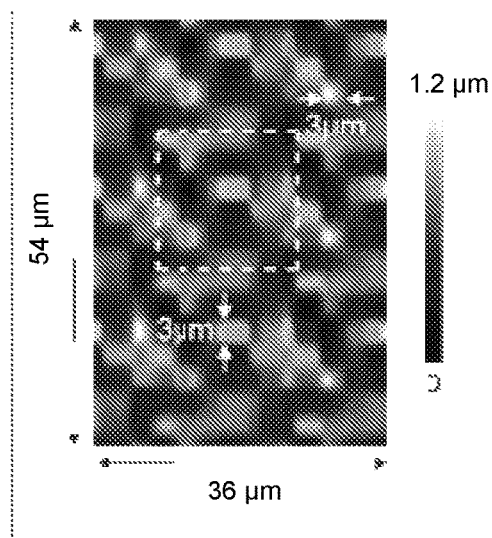
FIG. 24A
FIG. 24C
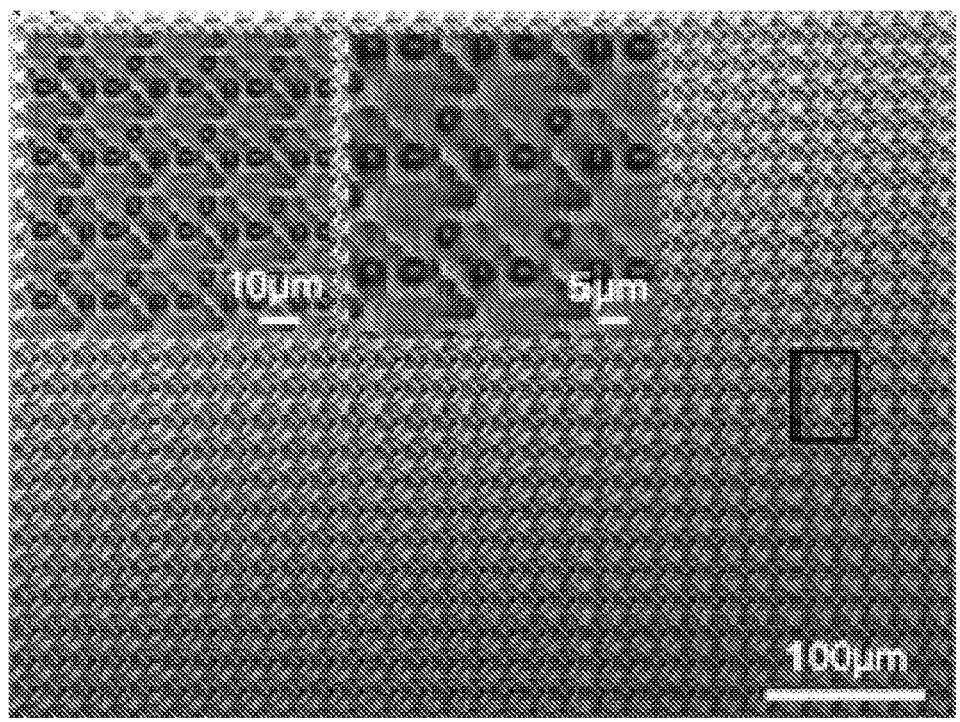
FIG. 24B

IMAGING DEVICE WITH IMAGE DISPERSING TO CREATE A SPATIALLY CODED IMAGE

RELATED APPLICATIONS

This application claims priority to U.S. Provisional Application No. 62/137,702, entitled "Imaging Device," filed Mar. 24, 2015, which is incorporated by reference in its entirety.

This application also claims priority to U.S. Provisional Application No. 62/251,010, entitled "Imaging Device," filed Nov. 4, 2015, which is incorporated by reference in its entirety.

BACKGROUND

Imaging devices, such as color cameras, can be used to capture images. The images can be still photographs or moving images, such as videos or movies. The imaging devices can operate using light within the visible spectrum or with other portions of the electromagnetic spectrum. Such imaging devices can use an image sensor to capture light and convert an optical image into an electronic signal which can then be stored or otherwise transmitted to construct an electronic image. Examples of image sensors can include charge-coupled devices (CCD) image sensors or complementary metal-oxide-semiconductor (CMOS) image sensors.

Traditional imaging systems map one point in the object space to one point in the image space. The spatial extension of the imaged point, the point-spread function (PSF), is essentially determined by far-field diffraction and aberrations present in the system. Historically, advanced lens design and manufacturing techniques were developed to minimize many types of aberrations to achieve the diffraction-limited PSF. Over the past decades, several methods have been extensively explored to resolve sub-diffraction features in super-resolution microscopy by either shrinking the physical dimension of the PSF or by using statistical estimation with pre-knowledge on the shape of the PSF.

Electronic sensors can typically only detect light intensity. In order to distinguish colors, an absorbing color-filter array (generally called the Bayer filter) is placed on top of the sensor. As such, only three colors (blue, green and red) are measured. However, natural scenes contain multi-spectral information, which can be valuable for numerous machine-vision applications. Conventional multi-spectral imagers (MSI) are expensive and cumbersome. A common MSI operates in a push-broom manner and utilizes a prism or grating to disperse light. The optical design for such an MSI can be quite complex. A second category of MSI employs either liquid crystal tunable filters or acousto-optic tunable filters to modulate the input spectrum over time. The former filter suffers from reduced throughput and slow speed, while the latter is expensive and has high power consumption.

Thus, despite incredible advances in digital image sensors and systems, such devices still suffer from poor low-light and multi-spectral performance.

SUMMARY

Embodiments of the present technology disclose an image capturing device comprising a sensor array, a lens positioned at a first distance from an intermediate image, and a polychromat positioned at a second distance from the lens. The polychromat can be configured to diffract the intermediate image according to a transform function to produce a dispersed sensor image onto the sensor array, the dispersed sensor image representing a spatial code of the intermediate image.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 24A is a schematic image of a diffractive filter and sensor array in one example.

FIG. 24B is a micrograph of a diffractive filter formed in accordance with the present invention.

FIG. 24C is an atomic-force micrograph of a portion of the diffractive filter of FIG. 24B.

Figure 1A:
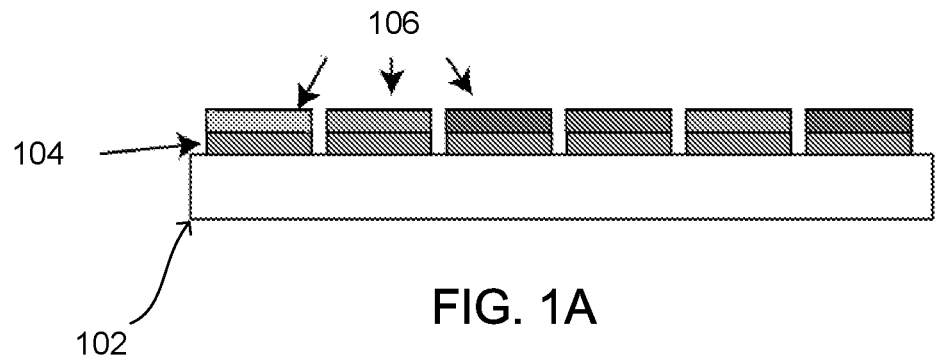
FIGS. 1A-1F illustrates imaging devices in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

In describing and claiming the present invention, the following terminology will be used.

The singular forms "a," "an," and "the" include plural referents unless the context clearly dictates otherwise. Thus, for example, reference to "a pixel" includes reference to one or more of such features and reference to "directing" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, and combinations of each.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

A technology is described for an imaging device that can effectively perform color imaging in low-light conditions. The imaging device can include a lens, a diffractive optic, and an array of sensors. The imaging device can include a color camera. The diffractive optic can also be referred to as a diffractive filter, a polychromat, or a chromatic filter and is a broadband diffractive optical element. The imaging device can perform imaging with multiple wavelengths (i.e., hyper-spectral imaging) or with multiple spectral bands (i.e., multi-spectral imaging). The imaging device can perform the imaging with a reduced amount of losses, which can allow the imaging device to effectively perform imaging in low-light conditions. The low-light imaging can be achieved because color information can be obtained with almost no absorption losses. The imaging device can utilize a reduced amount of optics, and can be produced at a reduced cost, since the diffractive filter for the imaging device can be manufactured using large-volume processes like roll-to-roll imprinting, embossing, UV-cured embossing, thermal embossing, moulding, imprint lithography, soft lithography, micro-contact printing, optical projection lithography, photolithography, extreme-ultraviolet lithography, water-immersion photolithography, etc. The imaging device can enable increased color and spatial resolution, as well as an increased signal-to-noise ratio. The spatial resolution can be a measure of how closely lines can be resolved in an image. In addition, the imaging device can provide a reduced trade-off between color and spatial resolution, as compared to conventional absorptive color filters, such as Bayer filters.

Consistent with these principles, an image capturing device can include a sensor array, a lens, and a polychromat (i.e. diffractive filter). The lens can be positioned at a first distance from an intermediate image. The polychromat can be positioned at a second distance from the lens, where the polychromat is configured to diffract the intermediate image according to a transform function to produce a dispersed sensor image onto the sensor array. The dispersed sensor image represents a spatial-spectral code of the intermediate image.

The spatial-spectral code can be a spatial intensity representation of at least one of wavelength or color. In some cases the intermediate image is a color image. In one example, the intermediate image is represented as $O(x',y',\lambda)$ and the sensor image is represented as $I(x,y)$, wherein $(x',y')$ are spatial coordinates of the intermediate image, $\lambda$ is wavelength, and $(x,y)$ are spatial coordinates of the sensor array.

The transfer function can be any suitable transform, which can be used to create and/or represent the spatial code. In one example, the transfer function is a real space transform. Alternatively, the transfer function can be a Fourier transform. In yet another alternative, the transfer function can be a scalar Fresnel-Kirchoff diffraction equation. In still another example, the transfer function can be a rigorous wave propagation function based on Maxwell's equations. For example, the propagation of the image through the polychromat onto the sensor may be modeled using Maxwell's equations. Therefore, one can use these in place of the Fresnel-Kirchoff diffraction equation. This can be useful when vector properties of light (e.g., polarization) are important to ascertain. This is also useful when the features on the diffractive filter are smaller than the wavelengths of interest.

In one specific example, the transfer function from the intermediate image to the sensor array is represented as $P(x,y; x',y',\lambda)$, wherein $(x',y')$ are spatial coordinates of the intermediate image, $(x,y)$ are spatial coordinates of the sensor array, and $\lambda$ is a wavelength.

In some cases, the transfer function is calibrated in order to reconstruct the intermediate image. In another specific example, the intermediate image is reconstructed using $O(x',y',\lambda) = [P(x,y; x',y',\lambda)]^{-1} I(x,y)$, wherein $I(x,y)$ represents the sensor image. In some cases, the spatial code can be used to reconstruct a 5-dimensional (5D) lightfield-spectral image. Accordingly, such a lightfield-spectral image can be reconstructed using $O(x',y',\theta_x,\theta_y,\lambda) = [P(x,y; x',y',\lambda)]^{-1} I(x,y)$, wherein $O(x',y',\theta_x,\theta_y,\lambda)$ is the unknown 5-dimensional lightfield-spectral image, $I(x,y)$ represents the sensor image and $P(x,y; x',y',\theta_x,\theta_y,\lambda)$ is the calibrated transfer function.

Although not required, the spatial code enables substantially all available photons to be used when forming the sensor image.

In another example, the sensor image can be represented as $I(x,y) = O(x',y',\lambda))$. $P(x,y; x',y') = \Sigma a_{m,n,k} P(x,y; x'_m, y'_m, \lambda_k)$, wherein $O(x',y',\lambda)$ represents the intermediate image, $P(x,y; x',y',\lambda)$ represents a transfer function from the intermediate image to the sensor array, $a_{m,n,k}$ are unknown values of the intermediate image at coordinates $(x'_m, y'_m, \lambda_k)$.

Advantageously, the sensor image is in accordance with a defined image quality level when the image capturing device operates in low-light conditions. The image quality can be defined in many ways including the use of various standard metrics such as color accuracy, image sharpness, white-balance accuracy, dynamic range, spatial and spectral resolutions, spectral accuracy, and the like.

In one example, the first distance is equal to a front-focal length of the lens. In another example, the second distance is equal to a back-focal length of the lens.

As explained in more detail below, the device allows for low light image acquisition. This is at least partially due to the device configuration, which allows omission of a color filter. Thus, typically the image capturing device does not include an absorptive color filter for producing the sensor image. Furthermore, the imaging can be performed using multiple wavelengths and/or with multiple spectral bands.

The diffractive filter or polychromat can be a patterned and transparent or semi-transparent substrate. The diffractive filter can further include an array of pixels each having a physical height which varies to determine a specific diffractive effect on incoming light as described herein. The diffractive filter can generally be a multi-level diffractive element including more than two diffractive pixel heights. However, in some cases, the diffractive filter can be a binary diffractive element having two diffractive pixel heights. This filter may be incorporated directly onto the sensor array. Alternatively, the filter may be manufactured separately and placed in close proximity to and aligned to the sensor array. As a general guideline, the diffractive filter, or polychromat, can be oriented from 10 nm to 2000 μm, and most often from 10 nm to 50 μm from the sensor array. Although various configurations can be used, in one example, the diffractive filter can have pixel heights ranging from 0 μm to 15 μm, and most often from 0 μm to 9 μm. Similarly, the diffractive filter can have a pixel width (e.g. assuming square pixels) from about 0.01 μm to about 15 μm, and often from about 0.5 μm to about 5 μm. Further, the pixel heights can include discrete multi-level heights such as 3 to 10 heights, although continuously variable pixel heights can also be used. The array of pixels can include a desired number of pixels corresponding to a complimentary sensor array (e.g. 1 to 32 MP or higher based on available sensor arrays). Although designs may vary, from 1 to 64 diffractive pixels can correspond to each sensor array pixel, in some cases 4 to 16 diffractive pixels per sensor array pixel, although generally any square number of diffractive pixels can be used (e.g. 4, 9, 16, 25, 36, 49, 64, 81, etc). In some cases, the diffractive pixel array can be a 1D array. For example, a 1D array can be useful when the camera is inspecting items on a conveyor belt or when the camera is on a drone flying over a region. In these examples, the relative motion of the camera to the object that is observed creates the image in the orthogonal direction of the 1D array. In this case, dispersion via the diffractive filter is only 1D and reconstruction can also be considerably simpler.

In some cases, the entire diffractive filter can have a unique diffractive pattern. However, in most cases, the diffractive filter can include a repeating diffractive pattern in two dimensions where a diffractive pattern sub-unit is repeated in x and y dimensions across the diffractive filter.

The diffractive filter can be formed of any suitable transmissive material which allows transmission of desired frequencies. Non-limiting examples of suitable material can include glass, plastic, photoresist, polymer, polystyrene, poly-methyl methacrylate, polycarbonate, PDMS, SU-8, 3D printable polymers, photo-activated polymers, quartz, silicon, silicon nitride, aluminum oxide, aluminum nitride, HSQ, electron-beam resist, PET, nano-imprint resist, and the like.

The device can additionally include a data processor adapted to reconstruct the intermediate image from the dispersed sensor image using the transfer function. The data processor can further include, or be associated with, memory coded with instructions to reconstruct the sensed image consistent with the disclosure herein.

Multi-spectral imagers reveal information unperceivable to humans and conventional cameras. In embodiments of the present technology a compact single-shot multi-spectral video-imaging camera is created by placing a micro-structured diffractive filter close to the image sensor. The diffractive filter converts spectral information to a spatial code on the sensor pixels. Following a calibration step, this code can be inverted via regularization-based linear algebra, to compute the multi-spectral image.

Although resolution can vary based on chosen parameters, in one embodiment, spectral resolution of 9.6 nm within the visible band (430 nm to 718 nm) can be achieved. In one embodiment, the spatial resolution is enhanced by over 30% using the present technology compared to a case with the same optics and sensor without the diffractive filter. Since no absorptive color filters are utilized in embodiments of the present technology, sensitivity is preserved as well. The diffractive filters can be easily manufactured using optical lithography and replication techniques.

As an example implementation of these principles, FIG. 1A illustrates an exemplary color-filter array (CFA) and a sensor array within an imaging device, such as a color camera. The imaging device can include an image sensor chip 102. A series of sensor pixels 104 can be positioned on top of the image sensor chip 102. The series of sensor pixels 104 can be part of a sensor array that is positioned on top of the image sensor chip 102. The sensor array can include sensors such as, but not limited to, a complementary metal-oxide-semiconductor (CMOS) sensor or a charge-coupled device (CCD) sensor.

In one example, a series of color filters (or color filter mosaic) can be positioned in front of the sensor array within the imaging device. The series of color filters can be placed over the sensor pixels 104 to capture color information. The series of color filters can be part of a color filter array (CFA). In one example, the CFA can be composed of four squares—two green squares, a blue square, and a red square. In another example, the color filters can be part of a Bayer-filter array 106. The color filters can be used because typical photosensors detect light intensity with little or no wavelength specificity, and therefore cannot separate color information. The color filters can filter the light by wavelength range, such that the separate filtered intensities can include information about the color of light.

Each spatial pixel of an image is comprised of 2×2 (or four) color sub-pixels. The color sub-pixel can sense color by absorption. For example, a red color sub-pixel can determine an amount of red that is within the spatial pixel because the red filter region absorbs the blue and green photons, but allows red photons to transmit. Similarly, a green color sub-pixel can determine an amount of green that is within the spatial pixel because the green filter region absorbs the red and blue photons, but allows green photons to transmit. Similarly, a blue color sub-pixel can determine an amount of blue that is within the spatial pixel because the blue filter region absorbs the green and red photons, but allows blue photons to transmit. Thus, the color filter array can provide information about the intensity of light in red, green and blue (RGB) wavelength regions. Raw image data that is captured by the image sensor can be converted to a full-color image (with intensities of all three primary colors represented at each pixel) by using a demosaicing algorithm that is tailored for each type of color filter.

Figure 1B:
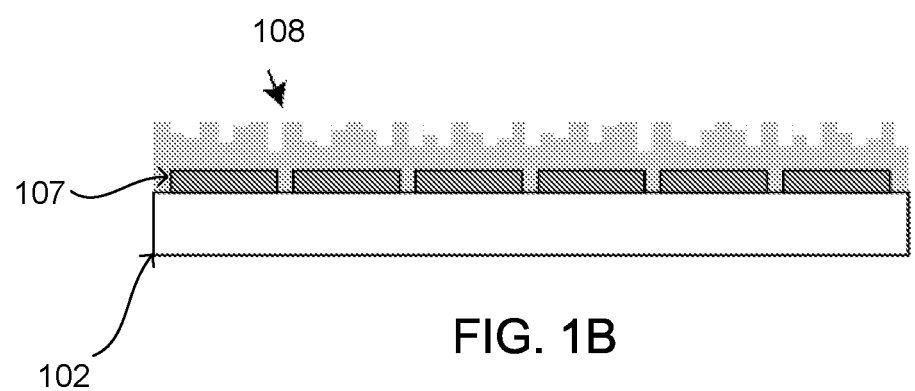

FIG. 1B illustrates an exemplary imaging device. The imaging device can include an image sensor chip 102 and a sensor array 107 positioned on top of the image sensor chip 102. The imaging device can include a diffractive filter 108 that is positioned on top of the sensor array 107. The diffractive filter 108 can be a replacement for an absorptive color filter, or can be used in addition to such a color filter. In one example, the diffractive filter 108 can be a multi-level diffractive structure. In addition, the diffractive filter 108 can be made of a transparent or semi-transparent material to light at wavelengths to be captured and imaged.

Figure 1C:
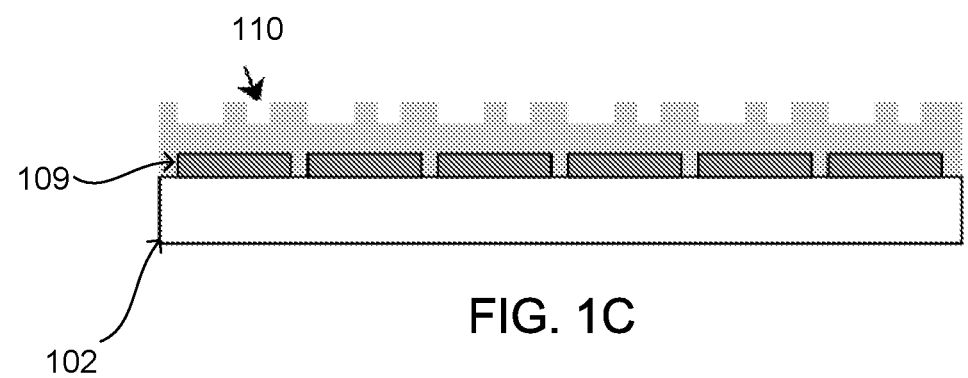

FIG. 1C illustrates another exemplary imaging device. The imaging device can include an image sensor chip 102 and a sensor array 109 positioned on top of the image sensor chip 102. The imaging device can include a diffractive filter 110 that is positioned on top of the sensor array 109. In this illustrated example, the diffractive filter 110 can be a binary diffractive structure. As can be seen, in some cases, the diffractive filter can include a base layer which is continuous across the filter and a pixel layer having an array of discrete pixel features with varied heights. In one example, the pixel layer can be facing incoming light (i.e. away from the sensor array). Alternatively, the pixel layer can be facing the sensor array. Generally, placing the patterned region as close to the sensor as possible can reduce the distance and hence the spread of light. A flat substrate surface facing away from the sensor array can also protect the topographical pattern from damage. In another optional aspect, the topographical pattern of the diffractive filter can also be protected by over-filling the pattern with a material that has a different refractive index. For example, glass or silicon nitride can be used as a protective layer.

Figure 1D:
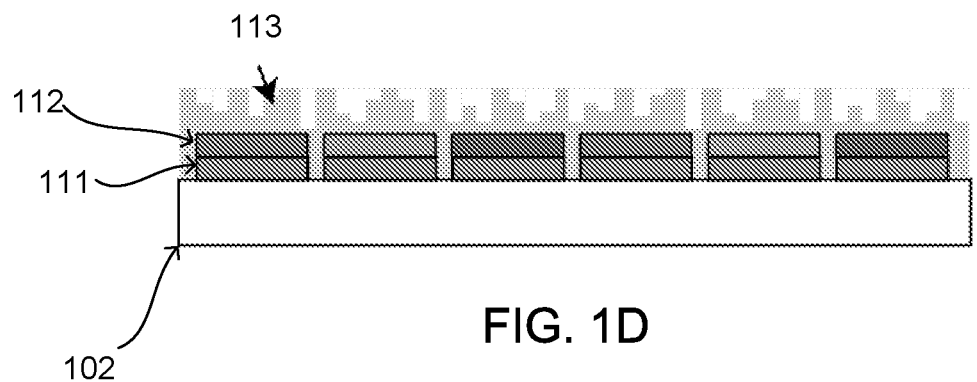

FIG. 1D illustrates yet another exemplary imaging device. The imaging device can include an image sensor chip 102, a sensor array 111 positioned on top of the image sensor chip 102, an absorptive color filter array 112 positioned on top of the sensor array 111, and a diffractive filter 113 positioned over the image sensor chip 102 (i.e., positioned over the sensor array 111 and the absorptive color filter array 112). The diffractive filter 113 can be a multi-level diffractive structure. The imaging device can be useful in performing visible and infrared (IR) imaging with a single device, wherein the visible imaging is performed using the absorptive color filter array 112 (i.e., a conventional color filter) and the IR image is obtained via the computational technique described herein. In this case, the diffractive filter 113 is designed to ensure that the diffractive filter 113 does not perturb the visible image, while dispersing the IR photons as desired. More specifically, the diffractive filter 113 can be designed by choosing a periodicity of the diffractive structure (e.g. diffractive filter sub-units) to be larger than a smallest IR wavelength of interest, but smaller than a longest visible wavelength of interest. In one example, this technique can be applicable to spectral bands other than visible and IR.

Figure 1E:
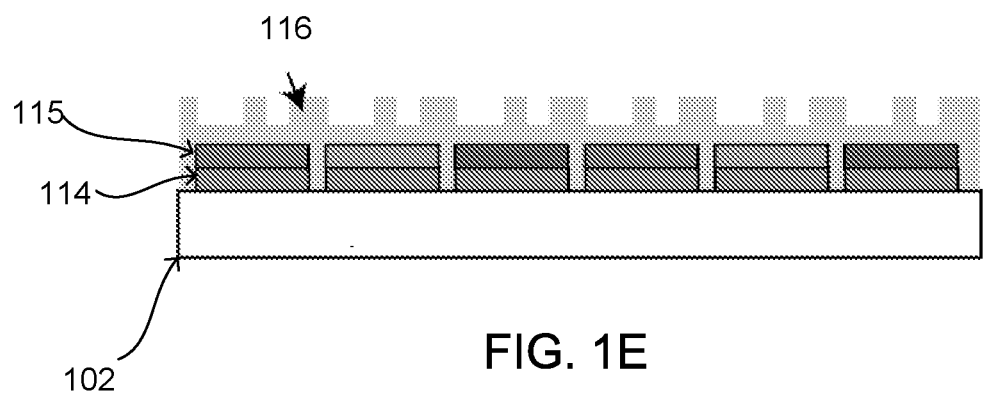

FIG. 1E illustrates still another exemplary imaging device. The imaging device can include an image sensor chip 102, a sensor array 114 positioned on top of the image sensor chip 102, an absorptive color filter array 115 positioned on top of the sensor array 114, and a diffractive filter 116 positioned over the image sensor chip 102 (i.e., positioned over the sensor array 114 and the absorptive color filter array 115). In this case, the diffractive filter 116 can be a binary-level diffractive structure.

The traditional technique of the color sub-pixel sensing the color by absorption can be inefficient, which can result in color cameras operating poorly under low light conditions, as compared to a black-and-white camera of the same specifications. Since each sensor pixel in a black-and-white camera represents a distinct spatial pixel (i.e., no CFA is present in the black-and-white camera), the spatial resolution can be superior to that of color cameras, especially under low-light conditions. The technology described herein can enable color cameras to perform similarly in low-light conditions (i.e., with an increased signal-to-noise ratio) and achieve a similar spatial resolution as compared to black-and-white cameras.

Low-light color cameras can have important applications in security imaging, traffic and toll cameras, industrial imaging, inspection of agricultural products and pharmaceuticals, outdoor imaging, consumer cameras, etc. A color sensor that is able to perform similarly to a black-and-white camera in terms of low-light performance can be widely used in color cameras. Further, such cameras can avoid or reduce use of flash lighting which can reduce power consumption of cameras.

Figure 1F:
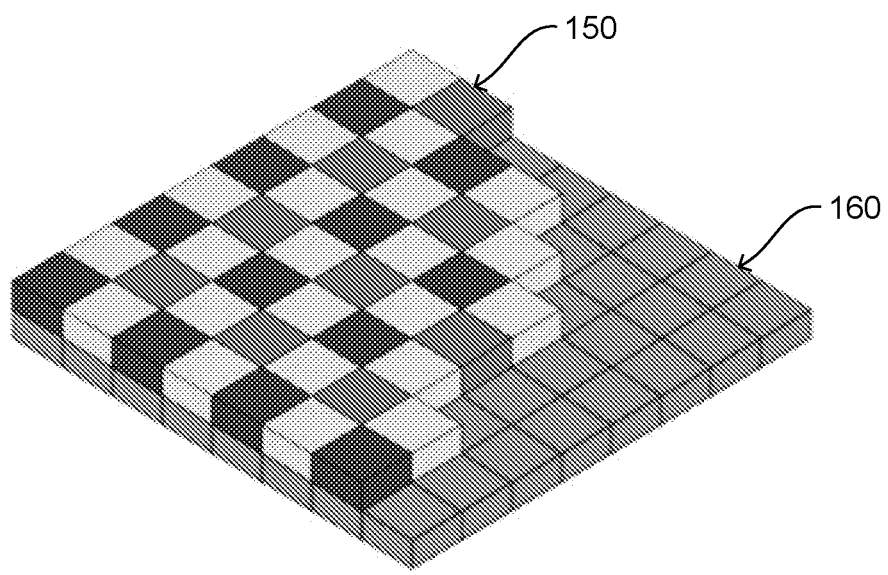

FIG. 1F illustrates a color-filter array (CFA) 150 and a sensor array 160 within an imaging device, such as a color camera. The CFA 150 (or color filter mosaic) can be positioned in front of the sensory array 160 within the imaging device. The CFA 150 is an absorptive color filter that is utilized in a majority of color cameras. The CFA 150 can be a mosaic of color filters placed over the pixel sensors of an image sensor to capture color information. The color filters can be used because typical photosensors detect light intensity with little or no wavelength specificity, and therefore cannot separate color information. The color filters can filter the light by wavelength range, such that the separate filtered intensities can include information about the color of light.

In one example, the CFA 150 can be a Bayer color filter. The sensory array 160 can include a complementary metal-oxide-semiconductor (CMOS) sensor or a charge-coupled device (CCD) sensor. The CFA 150 can be composed of four squares—two green squares, a blue square, and a red square.

Each spatial pixel of an image is comprised of 2×2 (or four) color sub-pixels. The color sub-pixel can sense color by absorption. For example, a red color sub-pixel can determine an amount of red that is within the spatial pixel because the red filter region absorbs the blue and green photons, but allows red photons to transmit. Similarly, a green color sub-pixel can determine an amount of green that is within the spatial pixel because the green filter region absorbs the red and blue photons, but allows green photons to transmit. Similarly, a blue color sub-pixel can determine an amount of blue that is within the spatial pixel because the blue filter region absorbs the green and red photons, but allows blue photons to transmit. Thus, the CFA 150 can provide information about the intensity of light in red, green and blue (RGB) wavelength regions. Raw image data that is captured by the image sensor can be converted to a full-color image (with intensities of all three primary colors represented at each pixel) by using a demosaicing algorithm that is tailored for each type of color filter.

Figure 2A:
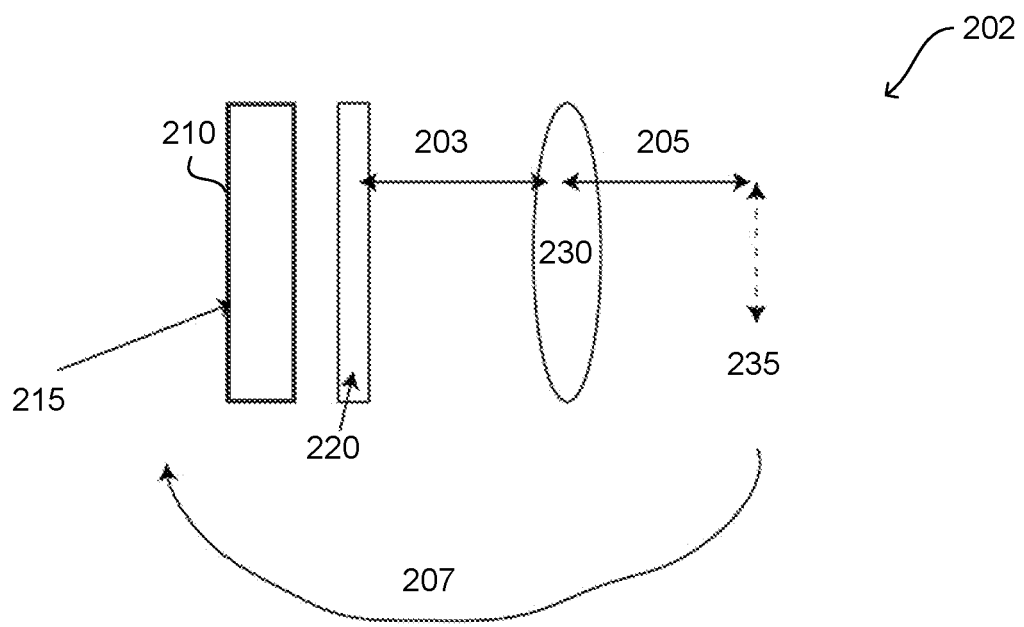
FIG. 2A is a schematic of an imaging device in accordance with an embodiment of the present invention.

FIG. 2A is a schematic of an exemplary imaging device 202. The imaging device 202 can include a sensor array 210, a polychromat 220, and a lens 230. In a conventional camera, an image can be formed by lenses such as lens 230 within the camera and the sensor can be placed in an image plane. As shown in FIG. 2A, the lens 230 can be placed at a distance equal to a front-focal length from an image plane (also referred to as an intermediate image 235). The intermediate image 235 can be represented as $O(x',y',\lambda)$, wherein $(x',y')$ are spatial coordinates and $\lambda$ is a wavelength. The polychromat 220 can be placed at a distance equal to a back-focal length 203 from the lens 230. In other words, the distance between the polychromat 220 and the lens 230 can be represented by the back-focal length 203, and the distance between the lens 230 and the intermediate image 235 can be represented by the front-focal length 202. A Fourier transform of the image can be formed at a plane between the polychromat 220 and the lens 230. The polychromat 220 can process the Fourier transform and form a dispersed image (i.e., a sensor image 215) onto the sensor array 210. The sensor image 215 can be represented as $I(x,y)$.

A transfer function 207 from the intermediate image 235 (or intermediate image plane) to the sensor array 210 can be represented as $P(x,y; x'y',\lambda)$. If the transfer function 207 is calibrated (as described in further detail below), then various algorithms can be applied to reconstruct the full color image. In one configuration, the polychromat 220 can be fully transparent and color information can be obtained as a type of spatial code, rather than using an absorptive filter. As a result, substantially all available photons can be used, which can achieve ideal low-light performance for the imaging device 202. In addition, since the bits in each sensor pixel can be utilized to obtain high-resolution grayscale data, there is no tradeoff between spatial and color resolution, which is in contrast to the Bayer color filter described above. In one example, a distance between the polychromat 220 and the intermediate image, as well as the distance between the polychromat 220 and the sensor array 210, is not critical for the imaging device 202 to function effectively in low-light conditions. These distances may be different than the back-focal length 203 and the front-focal length 205. As long as the calibration is performed properly, the reconstruction of the color image can be accurate. Thus, the image received at the sensor array is not typically spatially pixilated as a typical image. Rather, the sensor array receives a dispersed image (i.e. sensor image 215), which can be reconstructed into a spatial image.

The sensor image 215 (i.e., the image on the sensor array 210) can be given by a linear combination of the response of each point in the intermediate image 235. In discrete form, the intermediate image 235 can be represented by $$O(x',y',\lambda) = \Sigma a_{m,n,k} \delta(x'-x'_m, y'-y'_m, \lambda-\lambda_k) \quad \text{(Equation 1)},$$

wherein $a_{m,n,k}$ are unknown values of the color intermediate image 235 at coordinates $(x'_m, y'_m, \lambda_k)$. The measured sensor image 210 can be presented by $$I(x,y) = O(x',y',\lambda) \cdot P(x,y;x'y',\lambda) \quad \text{(Equation 2)},$$

which is equal to $$\Sigma a_{m,n,k} P(x,y;x'_m,y'_m,\lambda_k) \quad \text{(Equation 3)},$$

wherein $(x,y)$ are the coordinates on the sensor array 210, $(x',y')$ are coordinates in the intermediate image plane, and $P(x,y; x'y', \lambda)$ is the transfer function 207 from the intermediate image 235 (or intermediate image plane) to the sensor array 210. In other words, the transfer function 207 can represent a system that comprises the polychromat 220 and the lens 230. The intermediate image 235 can be reconstructed using $$O(x',y',\lambda)=[P(x,y;x',y',\lambda)]^{-1}I(x,y),$$ (Equation 4), which is a form of Equation 2.

Since Equation 2 is a linear equation, the inverse problem included in Equation 3 can be solved using a variety of techniques, such as a direct-binary search technique or a regularization-based matrix inversion technique, for example.

Figure 2B:
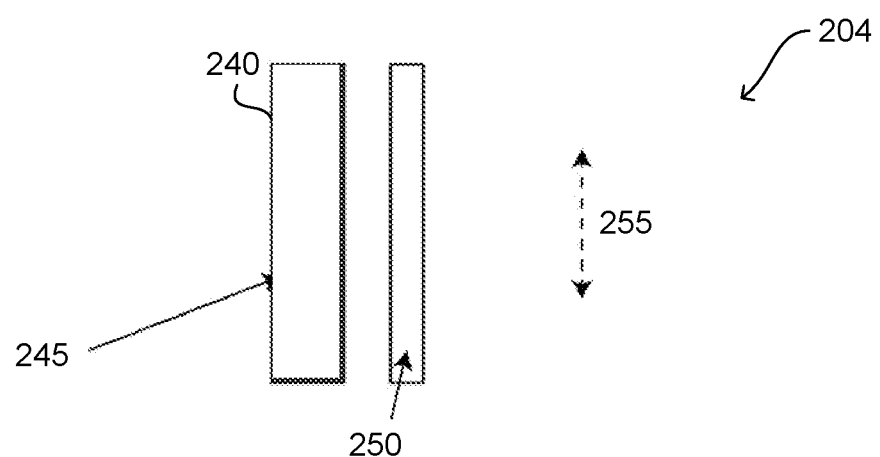
FIG. 2B is an additional schematic of an imaging device in accordance with an embodiment of the present invention.

FIG. 2B is a schematic of another exemplary imaging device 204. In contrast to the imaging device 202 shown in FIG. 2A, the imaging device 204 does not include a lens. As a result, the imaging device 204 shown in FIG. 2B is thinner, simpler and cheaper. The imaging device 204 can include a sensor array 240 and a polychromat 250. The polychromat 250 can be a defined distance from an image plane (also referred to as an intermediate image 255). The intermediate image 255 can be represented as $O(x',y',\lambda)$, wherein $(x',y')$ are spatial coordinates and $\lambda$ is a wavelength. The polychromat 240 can process a Fourier transform of a color image and form a dispersed image (i.e., a sensor image 245) onto the sensor array 245. The sensor image 245 can be represented as $I(x,y)$. However, a transfer function from the intermediate image 255 (or intermediate image plane) to the sensor array 245 is different for the imaging device 204, as compared to the imaging device 202. In this case, the intermediate image 255 is diffracted by the polychromat 250. The transfer function can be calibrated, and the intermediate image 255 can be reconstructed via Equation 3. In other words, Equation 3 can be solved in order to provide details of the color image.

The image capture device can alternatively include a pinhole calibration assembly, which allows determination of the transfer function and/or reconstruction of an image from the spatially coded sensor image. The pinhole calibration assembly can include a translatable pinhole element oriented between the lens and the sensor array. The pinhole calibration assembly can optionally include at least one calibration lens oriented between the translatable pinhole element and the polychromat. Notably, in some cases of the image capture device, there is no lens between the sensor array and the polychromat such that the first distance is greater than the second distance.

The image capture device can include a pinhole calibration assembly, which can include an array of translatable pinhole elements oriented between the lens and the sensor array. A spacing between translatable pinhole elements in the array can be selected such that a diffracted signal between two adjacent translatable pinhole elements does not overlap on the sensory array. Transfer functions from the translatable pinhole elements in the array can be compiled to obtain calibration data.

Figure 3:
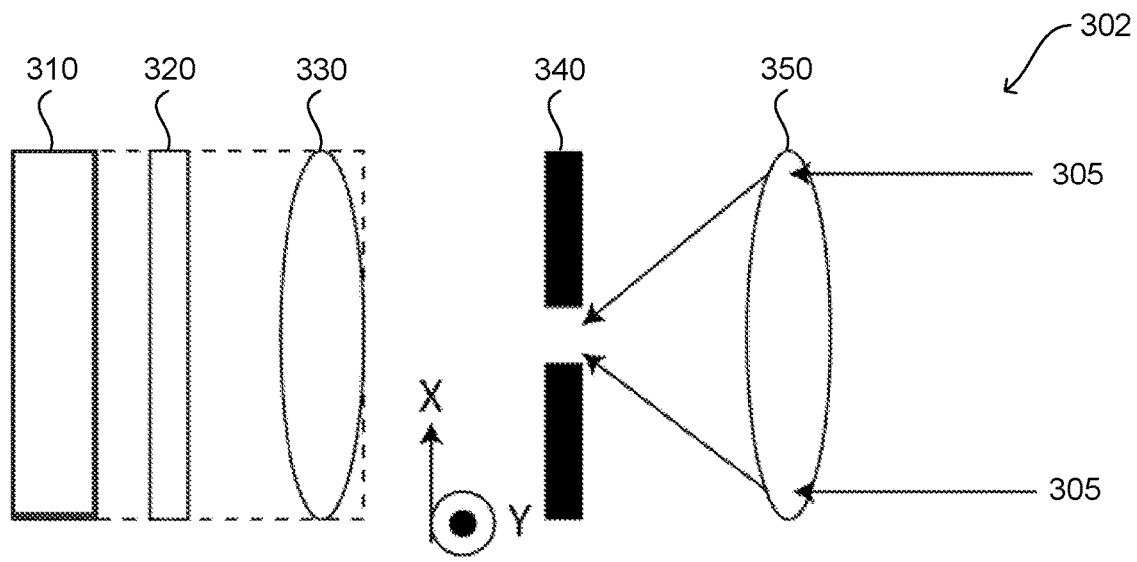
FIG. 3 illustrates a calibration of an imaging device in accordance with an embodiment of the present invention.

As an example, FIG. 3 illustrates a calibration of an imaging device 302. The imaging device 302 can include a sensor array 310, a polychromat 320, and a lens 330. The sensor array, the polychromat 320 and the lens 330 can also be referred to as a lens-polychromat-sensor sub-system. In an alternative configuration, the imaging device 302 can only include the sensor array 310 and the polychromat 320 (i.e., a polychromat-sensor system). In the alternative configuration, the lens 330 is not included.

In order for the imaging device 302 (e.g., a color camera) to operate effectively in low-light conditions, a transfer function of $P(x,y;x',y',\lambda)$ from an intermediate image (or intermediate image plane) to the sensor array 310 is to be calibrated.

In order to perform the calibration, the lens-polychromat-sensor subsystem can be mounted on a high precision X-Y stage and stepped in the X and the Y axes. At each position of $(x',y')$, the wavelength, $\lambda$ of the collimated incident light 305 can be scanned. The scanning can be achieved using a conventional monochromator 340 (or with a tunable filter) attached to a broadband source 350. In some examples, the broadband source 350 can include a lamp, a super continuum laser, a broadband (superluminescent) light-emitting diode, or any other form of broadband or narrowband illumination (e.g. lasers, LEDs, lamps, OLEDs, quantum dots, etc.). As shown in FIG. 3, incident light 305 from the broadband source 350 can be scanned using the monochromator 340. The incident light 305 can be scanned for each position of $(x',y')$. A sensor image at each value of $(x',y',\lambda)$ can be collected and stored. A data set of these sensor images can represent the measured transfer function, $P(x,y; x',y',\lambda)$. In one example, a similar scanning technique can be utilized for three-dimensional (3D) imaging. In another example, a similar scanning technique can be utilized for lightfield-spectral imaging.

In one example, the polychromat 320 can be a transparent or semi-transparent substrate. Although a variety of substrate materials can be used, non-limiting examples include glass, transparent plastic, PMMA, PET, TAC, Polystyrene, UV-curable polymer, thermally-curable polymer, silicon nitride, silicon oxide, silicon dioxide, aluminum oxide, transparent conducting oxides, transparent oxides, indium-tin oxide, photoresists, transparent polymers, and the like. The polychromat 320 can be patterned to diffract light, such that the image formed by each point $(x',y',\lambda)$ is unique on the sensor array 310. The polychromat 320 can have a deterministic pattern or a random pattern. The polychromat 320 can operate using far-field or quasi-near-field diffraction. In another example, the polychromat 320 can operate in the near-field. In the present technology, the polychromat 320 is explicitly designed in order to maximize the spatial and spectral resolution of the color image. The spatial and spectral resolution of the color image can be maximized by ensuring that the transfer function, $P(x,y; x',y',\lambda)$ can be diagonalized for inversion. In other words, the response of each point $(x',y',\lambda)$ on the sensor array 310 is ensured to be distinct from a closely spaced point $(x'+\partial x',y'+\partial y', \lambda+\partial\lambda)$. The polychromat 320 can be designed using nonlinear optimizations, which includes the application of genetic algorithms, simulated annealing, direct-binary search, etc.

Exemplary parameters used for designing the polychromat 320 in the imaging device 302 are illustrated in Table 1, as shown below. These parameters are representative and other alternative values can be utilized as well.

TABLE 1

| Exemplary parameters of the polychromat | |
| --- | --- |
| Design Type | Random |
| Design Name | 'Camera' |
| Material Name | 's1813' |
| Camera Type | 'ideal' |
| Pixel Size | 3 µm |
| Number of Pixels | 100 × 100 |
| Sensor Pixel Size | 6 µm |
| Maximum Height | 1.5 µm |
| Number of Levels | 16 |
| Unit Height | 16 |

TABLE 1-continued

Exemplary parameters of the polychromat

| | |
|---|---|
| Propagation Distance | 1 mm |
| Minimum Wavelength | 400 nm |
| Maximum Wavelength | 700 nm |
| Wavelength Sampling | 50 nm |
| Minimum Angle Theta | 0 |
| Maximum Angle Theta | 20 |
| Angle Theta Sampling | 10 |
| Number of Angle Phi | 4 |

Figures 4A, 4B:
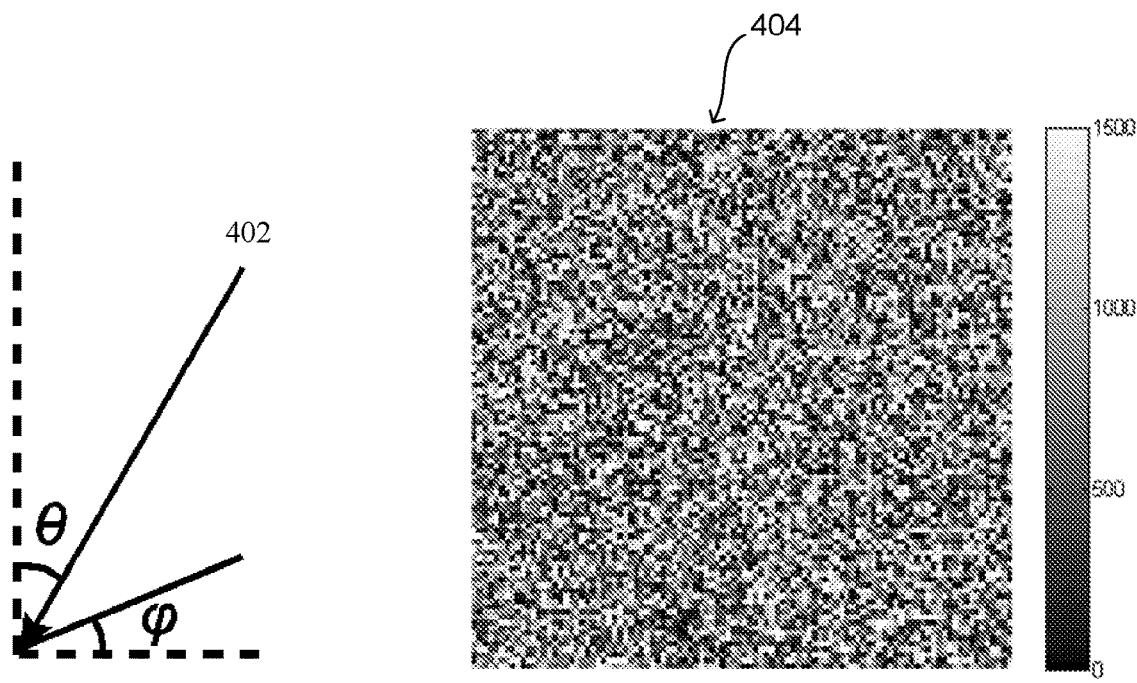
FIG. 4A illustrates an incident angle of incoming light to an imaging device in accordance with an embodiment of the present invention.
FIG. 4B is a profile of a polychromat in accordance with an embodiment of the present invention.

FIG. 4A illustrates an incident angle of incoming light 402 to an imaging device. For example, the incoming light can strike a lens that is in front of a polychromat. An angle of incidence can be represented by theta ($\theta$) and an azimuthal angle can be represented by phi ($\varphi$). The angle of incidence can refer to an angle between a ray incident on a surface and a line perpendicular to a surface at the point of incidence (also referred to as the normal). The azimuthal angle can refer to an angle between a projected vector and a reference vector. In other words, the azimuthal angle is a compass direction from which the light is coming from a light source.

In one example, the incident angles can be related to a position (x',y') in the intermediate image plane. For a configuration of the imaging device that includes a sensor array, the polychromat, and a lens (as shown in FIG. 2A), the following equations can be used: $(x'/f)=(1/\tan\theta\cos\varphi)$ and $(y'/f)=(1/\tan\theta\cos\varphi)$, wherein the position in the intermediate image plane is represented by (x',y'), $\theta$ represents the angle of incidence, $\varphi$ represents the azimuthal angle, and f is a focal length of the lens.

FIG. 4B is a profile of an exemplary polychromat 404. As described above, the polychromat 404 can be included in an imaging device that can operate in low-light conditions. The polychromat 404 can measure 100×100 square pixels, wherein each pixel can have a size of 3 µm. Therefore, the total dimensions of the polychromat can be 300 µm×300 µm. In addition, each pixel can be associated with a height value between 0 and 1500 µm (for example), wherein a value of 0 is black and a value of 1500 is white. The height values can vary from 0 to any desired value, typically up to tens of microns. However, the polychromat 404 can be designed to match the dimensions and requirements of any sensor.

Figure 5:
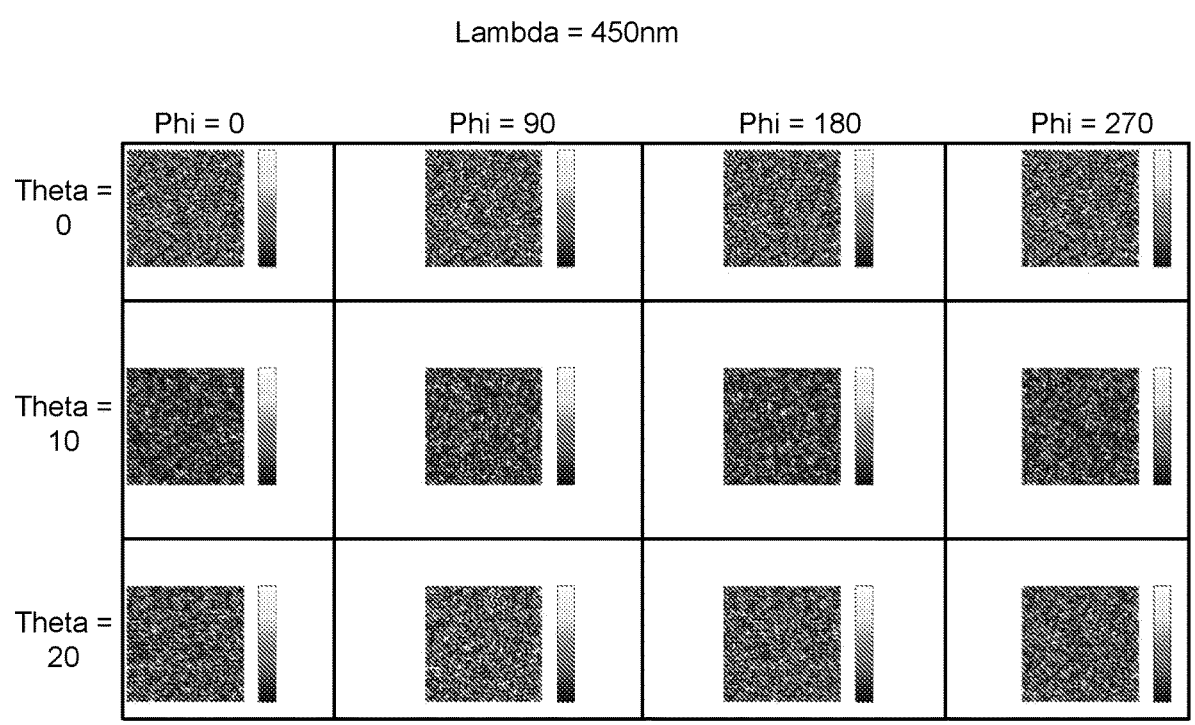
FIGS. 5-7 illustrate a plurality of point-spread functions that represent a response of a polychromat at various wavelengths and angles in accordance with an embodiment of the present invention.
Figure 6:
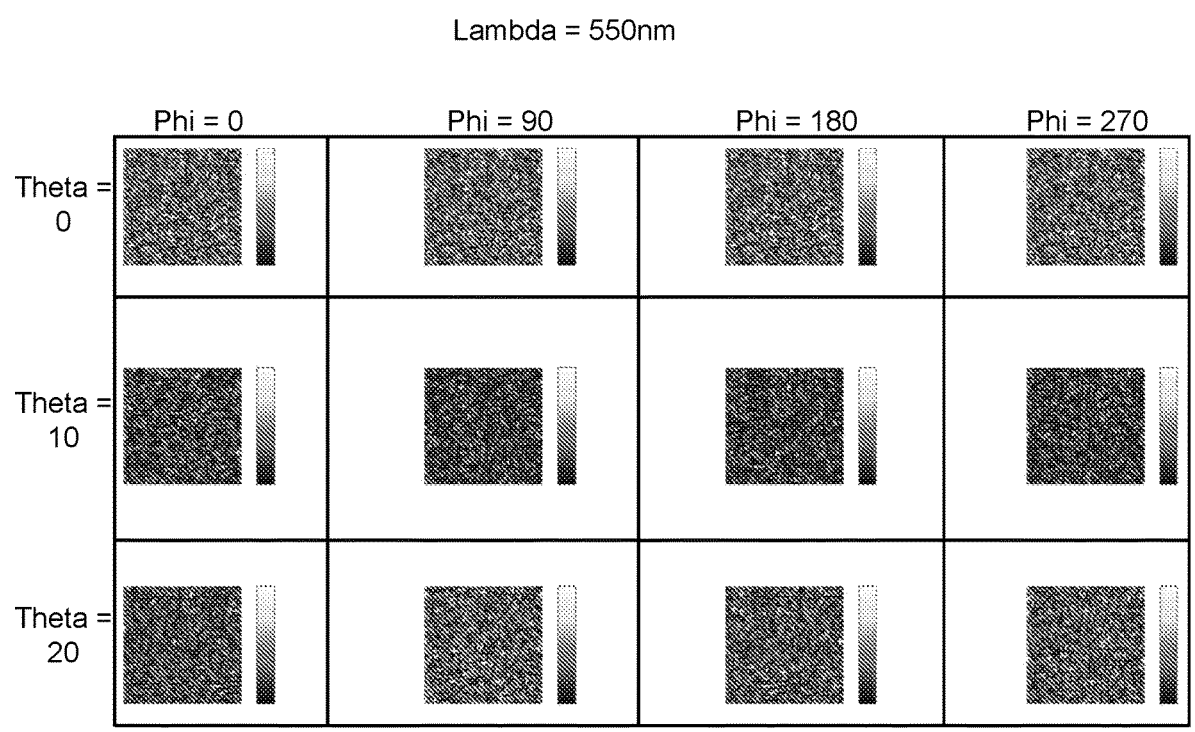
Figure 7:
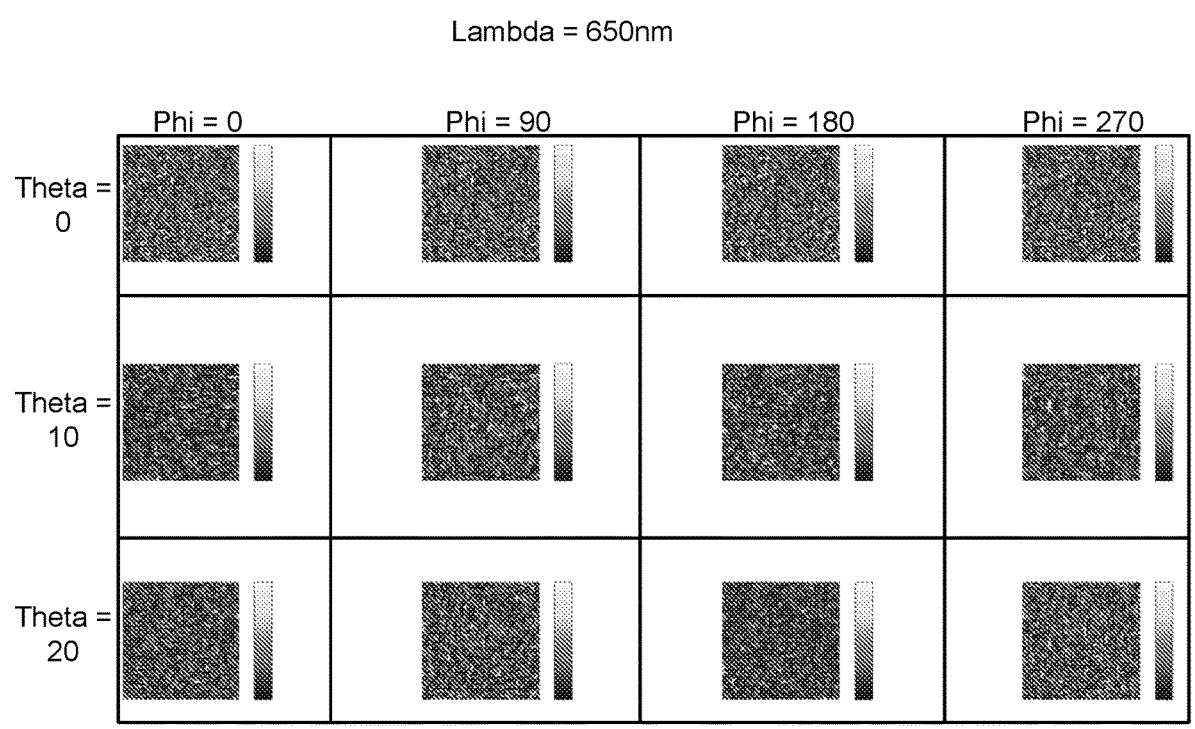

FIGS. 5-7 illustrate an example of a plurality of point-spread functions that represent a response of a polychromat at various wavelengths and angles. The point-spread functions can form a lookup table for the imaging device described above. The point-spread function is an image of a single point object. In other words, the point-spread function describes the response of an imaging system to the point object (or point source). A degree of spreading (i.e., blurring) in the image of the point object is a measure for the quality of the imaging system.

As shown in FIGS. 5-7, the plurality of spatial-spectral point-spread functions can be for defined wavelengths and at various angles. FIGS. 5-7 illustrate the spatial-spectral point-spread functions for 450 nanometer (nm), 550 nm, and 650 nm wavelengths, respectively. The azimuthal angle ($\varphi$) for each point-spread function can be one of 0, 90, 180 or 270 degrees. In addition, the angle of incidence ($\theta$) for each point-spread function can be one of 0, 10 or 20 degrees. Note from the angular spectrum information, the color and lightfield of an image can be computationally reconstructed.

In one example, a simulated reconstruction of an image can be performed. The image can be of an object (e.g., a random object or an artificial color object). The artificial color object can be synthesized using a set of random angular spectrum coefficients, as shown below in Table 2.

TABLE 2

Angular-spectrum coefficients of synthesized object

| | # | | | | | | | | |
|---|---|---|---|---|---|---|---|---|---|
| | 1 | 2 | 3 | 4 | 5 | 6 | 7 | 8 | 9 |
| Theta | 0 | 10 | 10 | 10 | 10 | 20 | 20 | 20 | 20 |
| Phi | 0 | 0 | 90 | 180 | 270 | 0 | 90 | 180 | 270 |

Figure 8A:
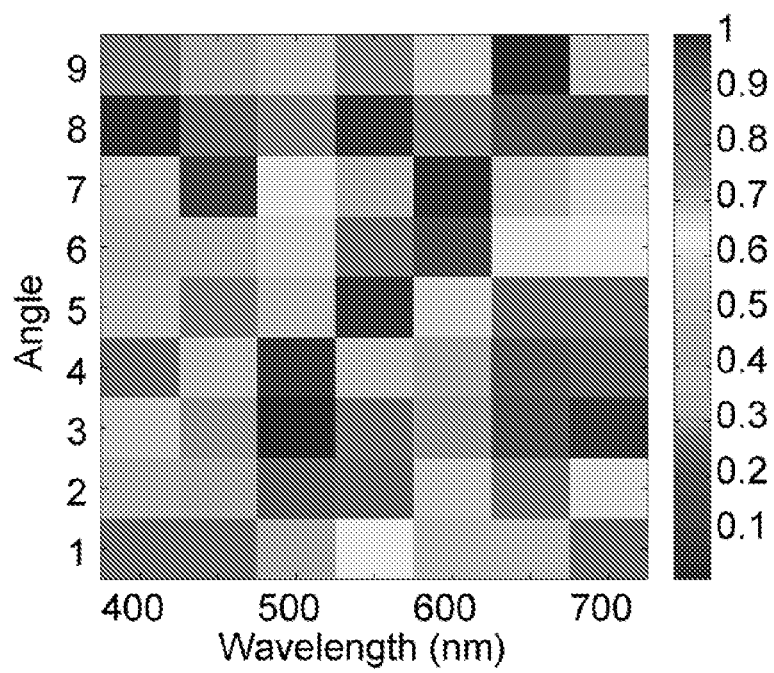
FIG. 8A illustrates a spectral-angular distribution of an object in accordance with an embodiment of the present invention.

FIG. 8A illustrates a spectral-angular distribution of the object (or artificial color object). In other words, FIG. 8A illustrates the wavelength and angular spectrum of the synthesized object. The wavelength can range from 400 nm to 700 nm with a spacing of 50 nm. Thus, the wavelengths can be 400 nm, 450 nm, 500 nm, 550 nm, 600 nm, 650 nm, and 700 nm. The angles can be derived from nine combinations of the incident angles (theta) and the azimuthal angles (phi) that are illustrated in Table 2. The incident angles can be one of 0 degrees, 10 degrees or 20 degrees. As shown in FIG. 8A, angle 1 can represent a theta equal to zero degrees and a phi equal to zero degrees, angle 2 can represent a theta equal to ten degrees and a phi equal to zero degrees, angle 3 can represent a theta equal to ten degrees and a phi equal to ninety degrees, and so on. The azimuthal angles can be one of 0 degrees, 90 degrees, 180 degrees or 270 degrees. As shown in FIG. 8A, a value between 0 and 1 can be used to represent each angle and wavelength pair (e.g., angle 7 and a wavelength of 600 nm).

Figure 8B:
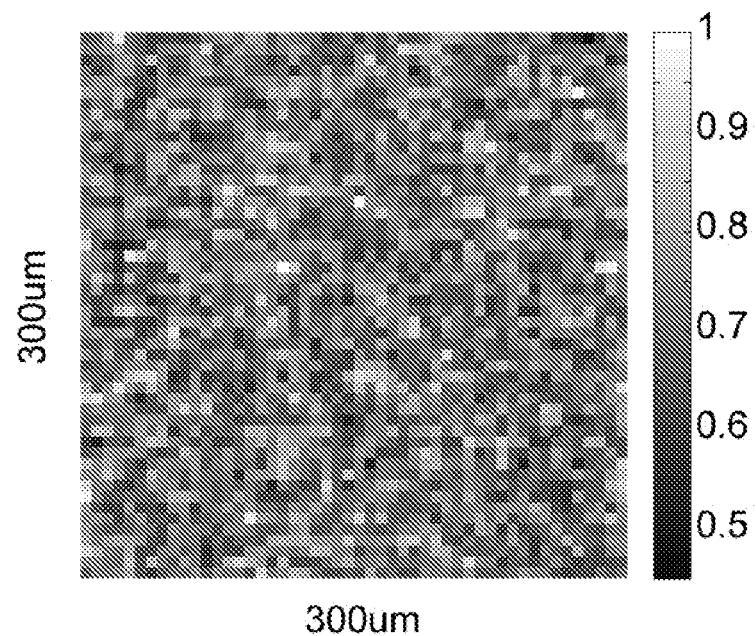
FIG. 8B illustrates a synthesized image that includes spectral and angular information of an object in accordance with an embodiment of the present invention.

FIG. 8B illustrates a synthesized image that includes spectral and angular information of the object. The synthesized image can be recorded by a monochrome imaging device. The synthesized image can have an imaging region of 300 µm×300 µm. The synthesized image can measure 100×100 square pixels, wherein each pixel can have a size of 3 µm. An intensity level for each pixel can be normalized to have a value between 0 and 1. Therefore, the synthesized image can encode both spectral and angular information of the simulated object (or artificial color object). Therefore, such a camera can provide not only color without absorption but also the lightfield information of the scene.

In one example, a simulated reconstruction of an image can be performed using a direct-binary-search (DBS) algorithm. A list of possible parameters used to perform the image reconstruction is shown below in Table 3.

TABLE 3

Parameters for DBS image reconstruction

| | |
|---|---|
| Design Type | 'Camera' |
| Image Name | 'real_Image.mat' |
| Unit Perturbation | 0.01 |
| Initial Type | random |
| Method | DBS |
| Final Error | 0.0181 |

Figure 9A:
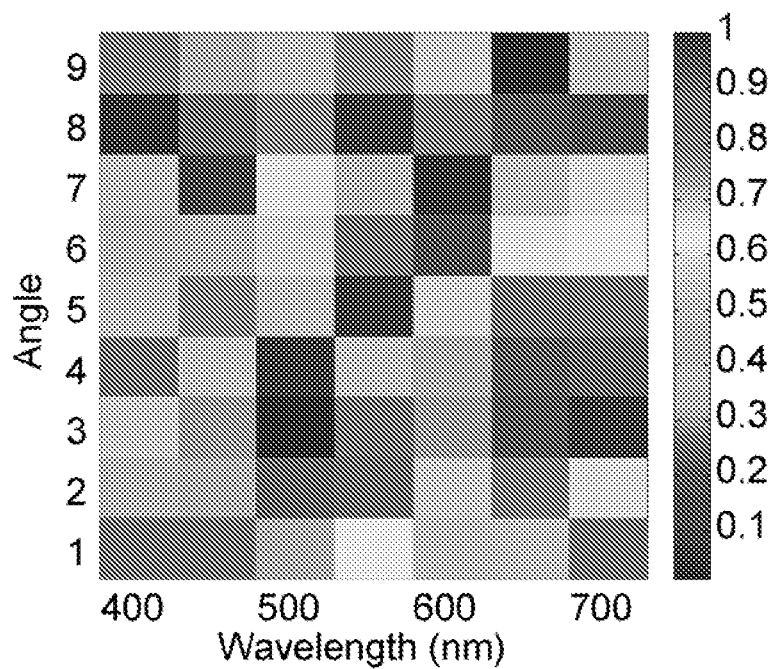
FIG. 9A illustrates an original spectral angular distribution of an object in accordance with an embodiment of the present invention.

FIG. 9A illustrates an original spectral angular distribution of an object (also known as an artificial color object or a simulated object). In other words, FIG. 9A illustrates the wavelength and angular spectrum of the simulated object. The wavelength can range from 400 nm to 700 nm with a spacing of 50 nm. The angles are derived from nine combinations of incident angles (i.e., 0, 10°, 20°) and azimuthal angles (0, 90°, 180°, 270°). As shown in FIG. 9A, a value between 0 and 1 can be used to represent each angle and wavelength pair (e.g., angle 2 and a wavelength of 450 nm).

Figure 9B:
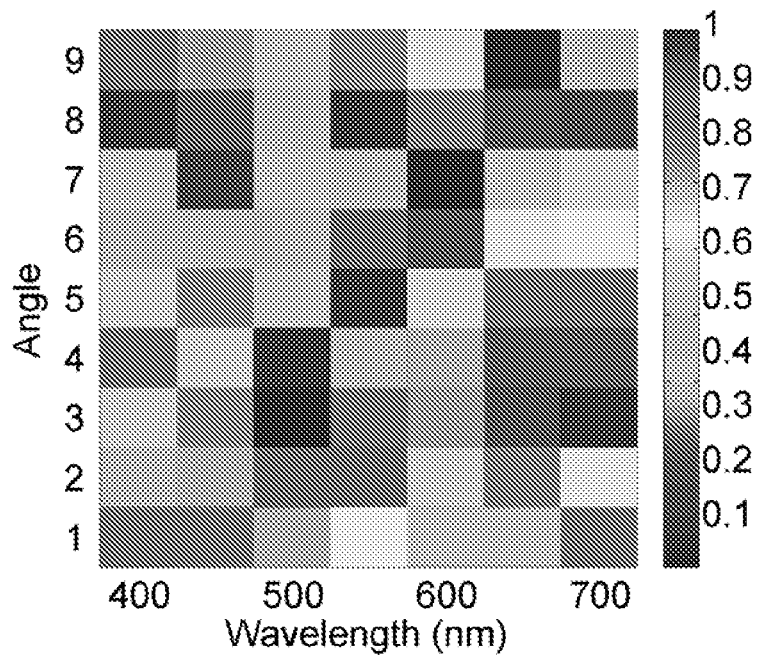
FIG. 9B illustrates an extracted spectral angular distribution of an object using a direct binary search (DBS) algorithm in accordance with an embodiment of the present invention.

FIG. 9B illustrates an extracted spectral angular distribution of an object. The spectral angular distribution of the object can be based on the numerically synthesized image in FIG. 8B (i.e., the synthesized image recorded by the monochrome sensor). The extracted spectral angular distribution of the object can be obtained using a direct-binary search (DBS) algorithm. As shown in FIG. 9B, the reconstructed spectral angular distribution is provided for a plurality of angles and wavelengths.

Figure 10A:
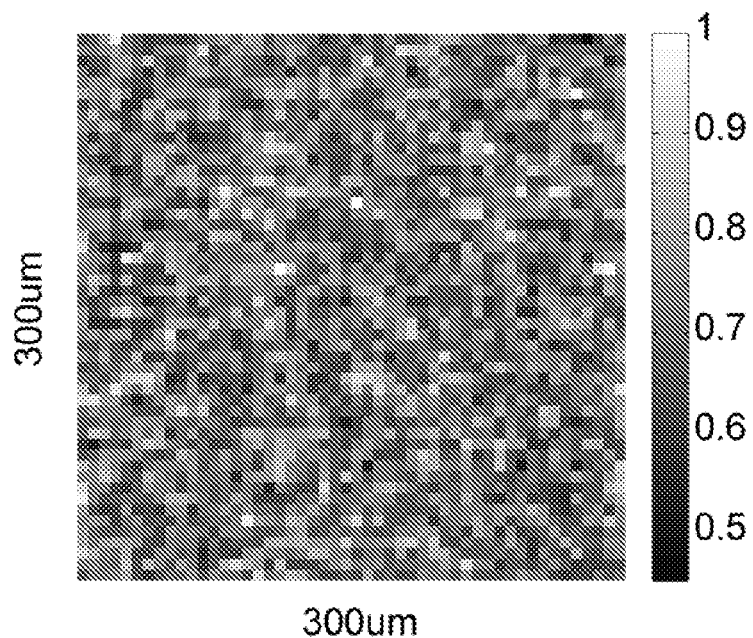
FIG. 10A illustrates a synthesized image that includes spectral and angular information of an object in accordance with an embodiment of the present invention.

FIG. 10A illustrates a synthesized image that includes spectral and angular information of the object. The synthesized image is the same as shown in FIG. 8B. The synthesized image (or an original camera-recorded image) can be from the simulated spectral angular distribution. The synthesized image can be recorded by a monochrome imaging device. The synthesized image can have an imaging region of 300 µm×300 µm. The synthesized image can measure 100×100 square pixels, wherein each pixel can have a size of 3 µm. An intensity level for each pixel can be normalized to have a value between 0 and 1. Therefore, the synthesized image can encode both spectral and angular information of the simulated object (or artificial color object).

Figure 10B:
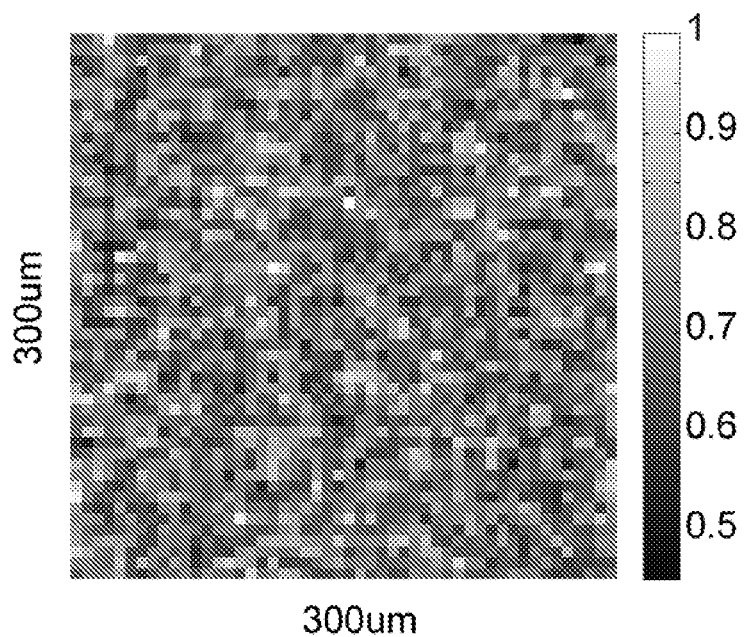
FIG. 10B illustrates a reconstructed intensity image in accordance with an embodiment of the present invention.

FIG. 10B illustrates an intensity image that has been reconstructed by multiplying the extracted spectral angular distribution (as shown in FIG. 9B) and a simulated spatial-spectral point-spread function at various angles (as shown in FIGS. 5-7). The intensity image can have an imaging region of 300 m×300 µm. The intensity image can measure 100×100 square pixels, wherein each pixel can have a size of 3 µm. In addition, an intensity level for each pixel can be normalized to have a value between 0 and 1.

Figure 11:
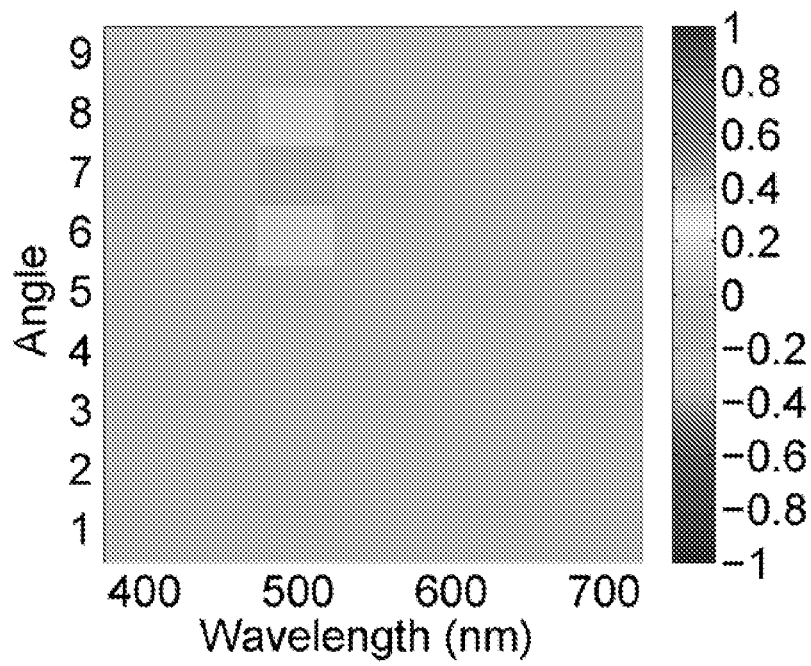
FIG. 11 illustrates an error map that indicates an error between an original spectral angular distribution of an object and an extracted spectral angular distribution of the object in accordance with an embodiment of the present invention.

FIG. 11 illustrates an error map between an original spectral angular distribution of an object (as shown in FIG. 9A) and an extracted spectral angular distribution of the object (as shown in FIG. 9B). The error map can indicate an error (or difference) between the original spectral angular distribution of the object and the extracted spectral angular distribution of the object. The error map can indicate how closely a reconstructed image correlates with an original object. In other words, a difference between the reconstructed image and the object can be quantified by plotting the error map. The error map indicates an error value for each angle and wavelength pair (e.g., angle 5 and a wavelength of 550 nm). The error value can be normalized to have a value between −1 and 1.

Figure 12:
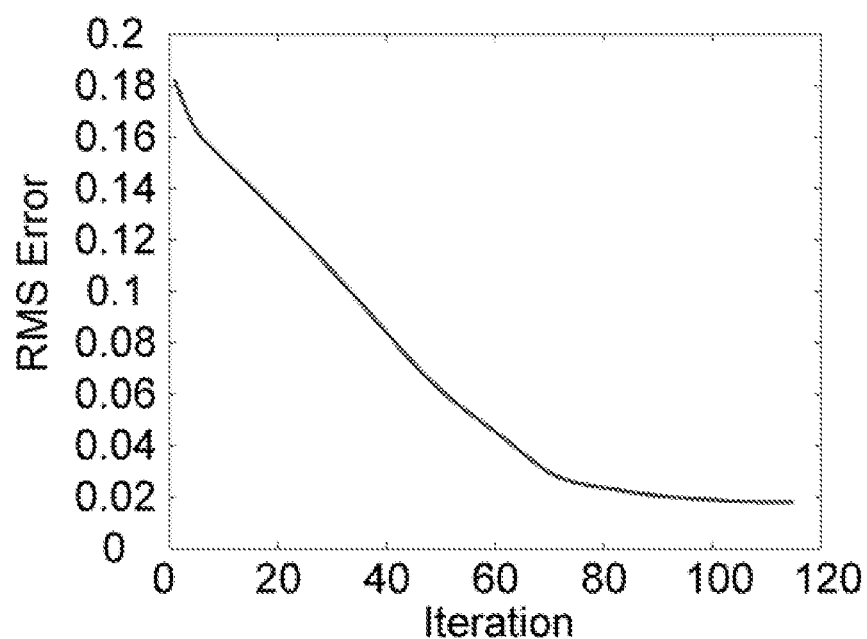
FIG. 12 illustrates a root mean square (RMS) error between an extracted spectral angular distribution of an object and the original spectral angular distribution of the object with respect to a time of iteration in accordance with an embodiment of the present invention.

FIG. 12 illustrates a root mean square (RMS) error between an extracted spectral angular distribution of an object and the original spectral angular distribution of the object with respect to a time of iteration. The extracted spectral angular distribution of the object is shown in FIG. 9B and the original spectral angular distribution of the object is shown in FIG. 9A. The RMS error between the extracted and the original spectral angular distributions of the object can be plotted with respect to times of iteration in a direct binary search (DBS)-based extraction algorithm. Since DBS is an iterative algorithm, the RMS error can be plotted as a function of the iteration number. As shown in FIG. 12, a solution can converge in approximately 70 iterations. The RMS error can remain steady at roughly 0.02 after approximately 70 iterations.

As explained earlier, a first technique for image reconstruction can be performed involving a direct binary search (DBS) algorithm. In addition, a second technique for image reconstruction can be performed involving a multi-level search (MLS) technique. MLS utilizes a search method over multiple height levels in a single iteration in order to perform a more comprehensive search as compared to DBS.

During a single iteration in MLS, each pixel in a wavelength-angle map can be selected in a random order. The value of each pixel is divided into 1000 levels (i.e., a unit perturbation of 0.001). In contrast to DBS, which utilizes a perturbation, all possible values of this pixel are evaluated. For example, values 0, 0.001, 0.002, . . . 0.999, 1.000 are evaluated for the pixel. A vector of RMS errors between real and reconstructed images at all of these values is generated. A minimum RMS error is chosen and the corresponding value is assigned to this pixel as an optimal value. The process repeats until all of the pixels in the wavelength-angle map are traversed. Thus, after a single iteration, the same process is repeated for all of the pixels until a termination condition is satisfied (e.g., a minimum RMS improvement between two iterations or a minimum number of pixels changed).

A list of possible parameters used to perform the multi-level search is shown below in Table 4.

TABLE 4

Parameters for multi-level search (MLS) image reconstruction

| | |
|---|---|
| Design Type | 'Camera' |
| Image Name | 'real__Image.mat' |
| Unit Perturbation | 0.01 |
| Initial Type | random |
| Method | MLS |
| Final Error | 0.0133 |

Figure 13A:
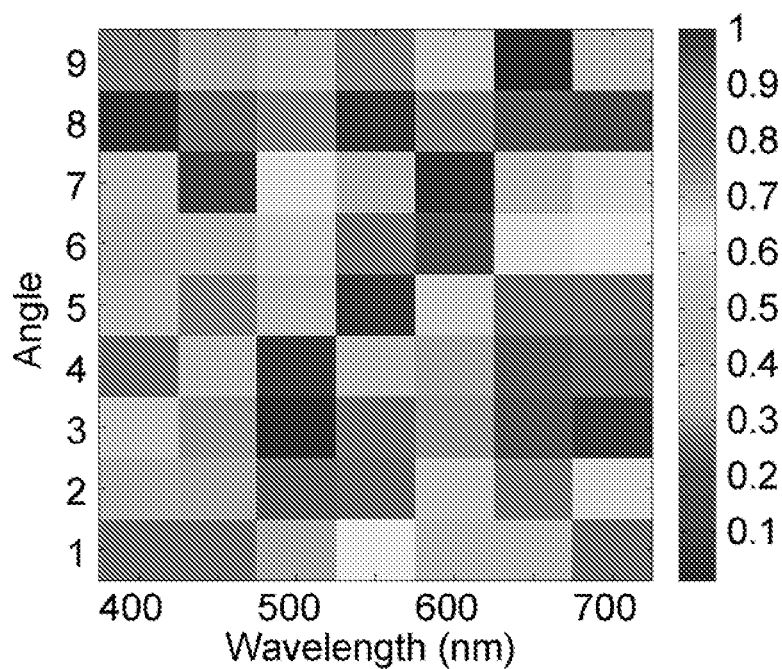
FIG. 13A illustrates an original spectral angular distribution of an object in accordance with an embodiment of the present invention.

FIG. 13A illustrates an original spectral angular distribution of an object (also known as an artificial color object or a simulated object). In other words, FIG. 13A illustrates the wavelength and angular spectrum of the simulated object. The wavelength can range from 400 nm to 700 nm with a spacing of 50 nm. The angles are derived from nine combinations of incident angles (i.e., 0, 10°, 20°) and azimuthal angles (0, 90°, 180°, 270°). As shown in FIG. 13A, a value between 0 and 1 can be used to represent each angle and wavelength pair (e.g., angle 2 and a wavelength of 450 nm).

Figure 13B:
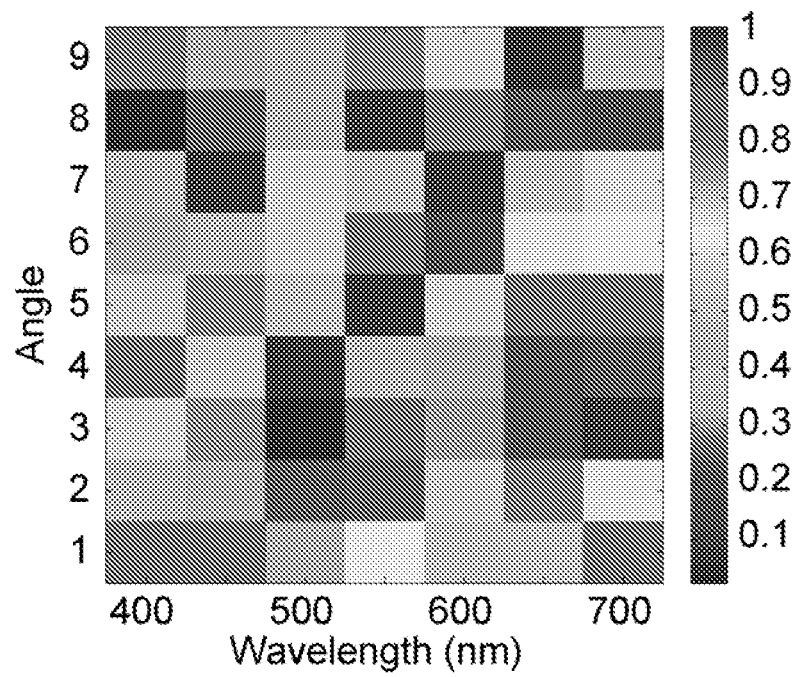
FIG. 13B illustrates an extracted spectral angular distribution of an object using a multi-level search (MLS) algorithm in accordance with an embodiment of the present invention.

FIG. 13B illustrates an extracted spectral angular distribution of an object. The spectral angular distribution of the object can be based on the numerically synthesized image in FIG. 8B (i.e., the synthesized image recorded by the monochrome camera). The extracted spectral angular distribution of the object can be obtained using a multi-level search (MLS) algorithm. As shown in FIG. 13B, the reconstructed spectral angular distribution is provided for a plurality of angles and wavelengths.

Figure 14A:
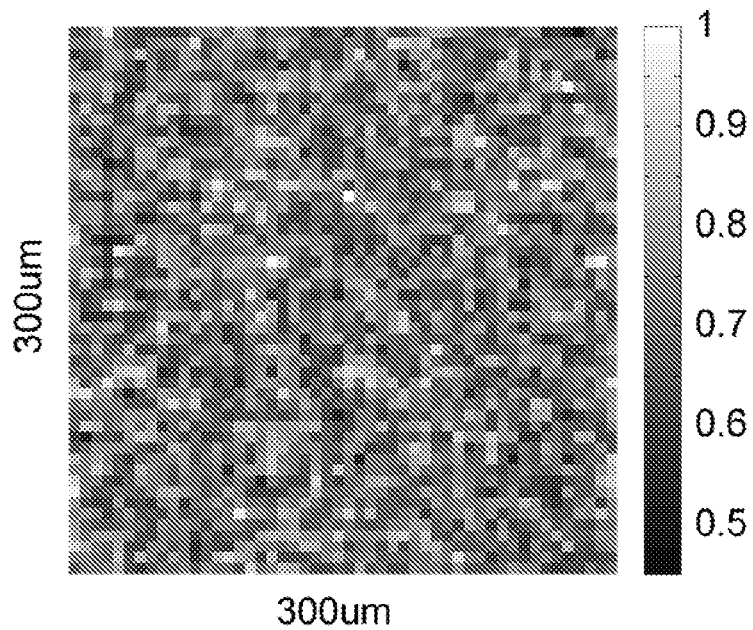
FIG. 14A illustrates a synthesized image that includes spectral and angular information of an object in accordance with an embodiment of the present invention.

FIG. 14A illustrates a synthesized image that includes spectral and angular information of the object. The synthesized image (or an original camera-recorded image) can be from the simulated spectral angular distribution. The synthesized image can be recorded by a monochrome sensor. The synthesized image can have an imaging region of 300 µm×300 µm. The synthesized image can measure 100×100 square pixels, wherein each pixel can have a size of 3 µm. An intensity level for each pixel can be normalized to have a value between 0 and 1. Therefore, the synthesized image can encode both spectral and angular information of the simulated object (or artificial color object).

Figure 14B:
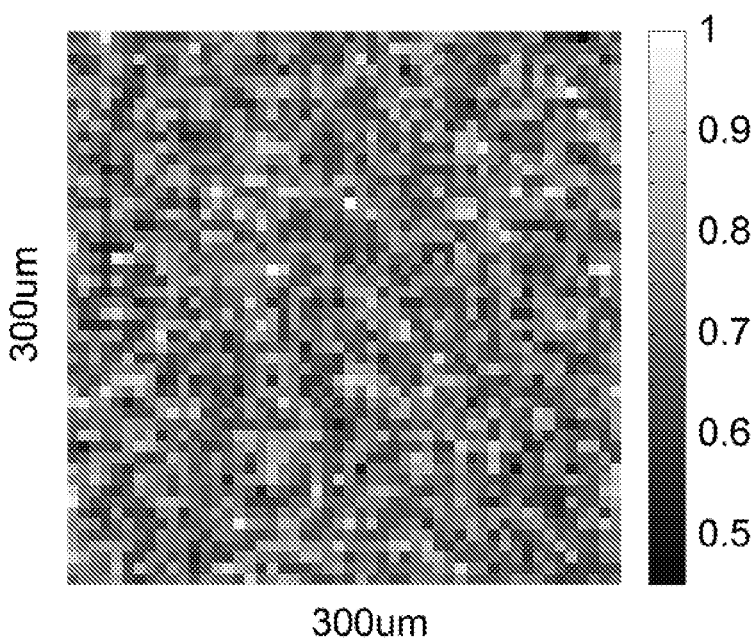
FIG. 14B illustrates a reconstructed intensity image in accordance with an embodiment of the present invention.

FIG. 14B illustrates an intensity image that has been reconstructed by multiplying the extracted spectral angular distribution (as shown in FIG. 13B) and a simulated spatial-spectral point-spread function at various angles (as shown in FIGS. 5-7). The intensity image can have an imaging region of 300 µm×300 µm. The intensity image can measure 100×100 square pixels, wherein each pixel can have a size of 3 µm. In addition, an intensity level for each pixel can be normalized to have a value between 0 and 1.

Figure 15:
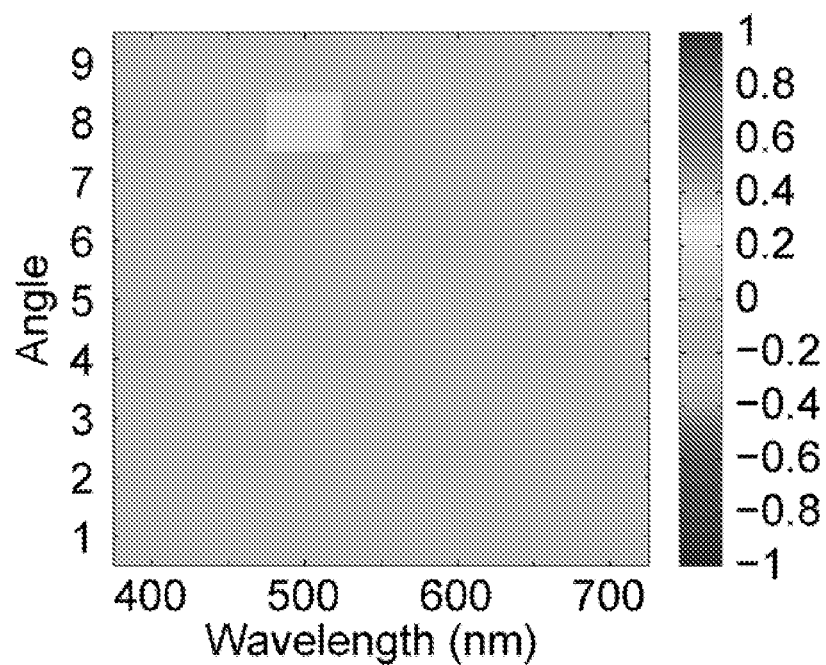
FIG. 15 illustrates an error map that indicates an error between an original spectral angular distribution of an object and an extracted spectral angular distribution of the object in accordance with an embodiment of the present invention.

FIG. 15 illustrates an error map between an original spectral angular distribution of an object (as shown in FIG. 13A) and an extracted spectral angular distribution of the object (as shown in FIG. 13B). The error map can indicate an error (or difference) between the original spectral angular distribution of the object and the extracted spectral angular distribution of the object. The error map can indicate how closely a reconstructed image correlates with an original object. In other words, a difference between the reconstructed image and the object can be quantified by plotting the error map. The error map indicates an error value for each angle and wavelength pair (e.g., angle 1 and a wavelength of 400 nm). The error value can be normalized to have a value between −1 and 1.

Figure 16:
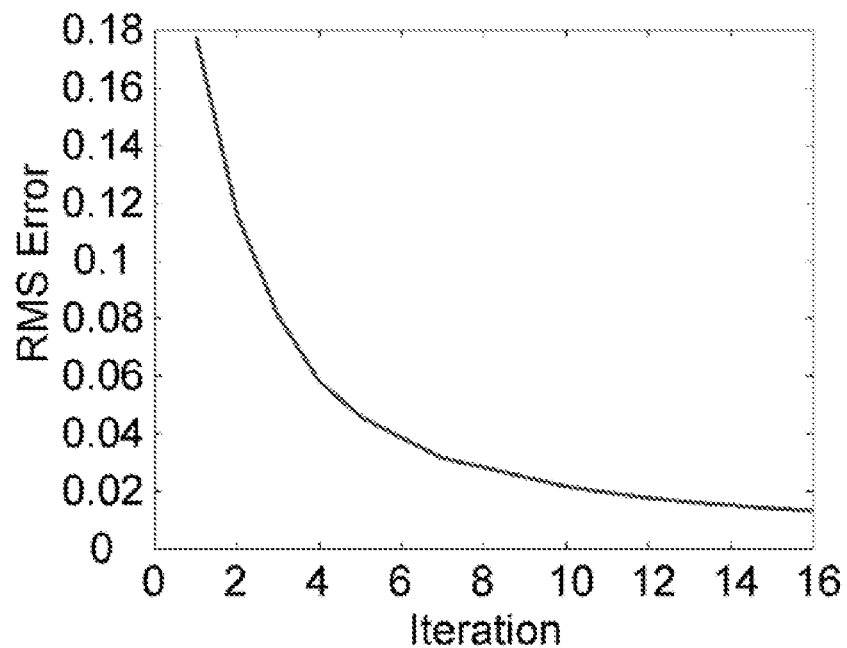
FIG. 16 illustrates a root mean square (RMS) error between an extracted spectral angular distribution of an object and the original spectral angular distribution of the object with respect to a time of iteration in accordance with an embodiment of the present invention.

FIG. 16 illustrates a root mean square (RMS) error between an extracted spectral angular distribution of an object and the original spectral angular distribution of the object with respect to a time of iteration. The extracted spectral angular distribution of the object is shown in FIG. 13B and the original spectral angular distribution of the object is shown in FIG. 13A. The RMS error between the extracted and the original spectral angular distributions of the object can be plotted with respect to times of iteration in a multi-level search (MLS)-based extraction algorithm. Due to a more global search methodology (as compared to DBS), the solution can converge in a reduced number of iterations. As shown in FIG. 16, the RMS error can remain steady at roughly 0.02 after approximately 16 iterations, as opposed to the approximately 70 iterations when using the DBS algorithm.

In accordance with one embodiment of the present invention, an image capturing device is disclosed. The image capturing device can include a sensor array. The image capturing device can include a lens positioned at a first distance from an intermediate image. The image capturing device can include a polychromat positioned at a second distance from the lens, the polychromat being configured to: obtain color information from the intermediate image formed on the lens using a spatial grayscale code; and process a Fourier transform of the intermediate image in order to form a dispersed sensor image onto the sensor array.

In one configuration, the sensor image is a color image. In another configuration, the sensor image is a monochrome image. In another configuration, the intermediate image is represented as $O(x',y',\lambda)$ and the sensor image is represented as $(x,y)$, wherein $(x',y')$ are spatial coordinates of the intermediate image, $\lambda$ is a wavelength, and $(x,y)$ are spatial coordinates of the sensor array. In yet another configuration, a transfer function from the intermediate image to the sensor array is represented as $P(x,y; x'y',\lambda)$, wherein $(x',y')$ are spatial coordinates of the intermediate image, $(x,y)$ are spatial coordinates of the sensor array, and $\lambda$ is a wavelength.

In one example, the transfer function is calibrated in order to reconstruct the intermediate image. In another example, the intermediate image is reconstructed using: $O(x',y', \theta_x,\theta_y, \lambda)=[P(x,y; x'y',\theta_x,\theta_y,\lambda)]^{-1}I(x,y)$, wherein $I(x,y)$ represents the sensor image. In yet another example, the spatial code enables substantially all available photons to be used when forming the sensor image. In addition, the sensor image is represented as $I(x,y)=O(x',y',\lambda)\cdot P(x,y; x'y',\lambda)=\Sigma a_{m,n,k}P(x,y; x'_m,y'_m,\lambda_k)$, wherein $O(x',y',\lambda)$ represents the intermediate image, $P(x,y; x',y',\lambda)$ represents a transfer function from the intermediate image to the sensor array, and $a_{m,n,k}$ are unknown values of the intermediate image at coordinates $(x'_m,y'm,\lambda_k)$.

In one configuration, the sensor image is in accordance with a defined image quality level when the image-capturing device operates in low-light conditions. In another configuration, the first distance is equal to a front-focal length of the lens. In yet another configuration, the second distance is equal to a back-focal length of the lens.

In one example, the image-capturing device does not include an absorptive color filter for producing the sensor image. In another example, imaging is performed using multiple wavelengths or with multiple spectral bands. In yet another example, the polychromat is a patterned and transparent or semi-transparent substrate.

The transform function can often be a Fourier transform which can be particularly useful in 3D (i.e. light field cameras). However, Fourier transforms can be computationally intensive. Accordingly, in some cases it can be desirable to utilize transforms in real space. In the subject application, color information is obtained computationally. This involves the characterization and storage of a large amount of data as lookup tables, etc. This is the case when processing of the image happens in the Fourier space. Another embodiment achieves a similar outcome but color-information processing occurs in real space. This renders the calibration data for the point-spread function (or transfer function of the system) very sparse and much easier to handle numerically. A variety of algorithms used in compressed sensing and related fields can then be applied to obtain the color and image intensity information.

Figure 17:
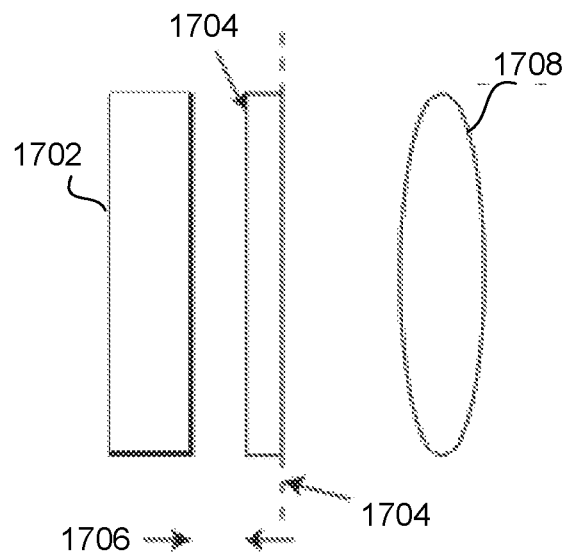
FIG. 17 is a schematic of a diffractive-color sensor with a broadband diffractive element (polychromat) in front of the monochrome sensor array in accordance with an embodiment of the present invention.

In this embodiment, the sensor system is comprised of a conventional monochrome sensor (without the color-filter array) and a polychromat. The spacing between the sensor array and the polychromat is d and can be anywhere from several tens of nanometers to several mm. However, once this spacing is selected (for choice of spatial and spectral resolutions, and to avoid cross-talk, etc.), this spacing is fixed. Imaging optics as in any imaging system (camera, telescope, microscope, etc.) can be placed in front of this sensor-polychromat assembly such that the final image is formed on the polychromat plane, as indicated in FIG. 17. The polychromat 1704 diffracts the light from this image onto the sensor array 1702. By calibrating very carefully, how the light diffracts from each distinct image point, then the color and spatial details of the image can be computed as described below. The image may be formed on plane 1706 of sensor array 1704. In one embodiment, the distance 1706 between the polychromat 1704 and sensor array 1702 is a range between 0.05 mm to 5 mm. The image may be formed on plane 1706 of sensor array 1704. The optics 1708 represent conventional imaging optics such as a lens.

Figure 18:
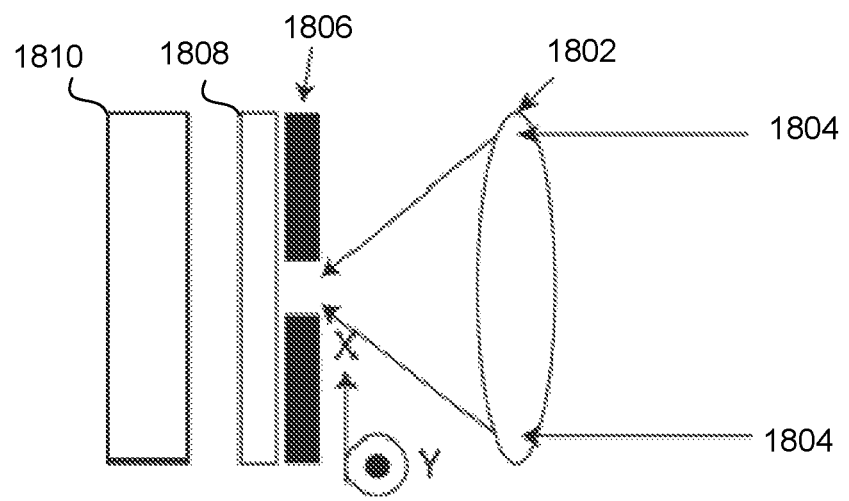
FIG. 18 is a schematic illustration of a image capturing device including a pinhole calibration assembly oriented between the polychromat and the lens in accordance with an embodiment of the present invention.

One simple approach to calibrating this assembly is to place a pinhole in close proximity to the polychromat, as shown in FIG. 18. The pinhole is illuminated by a suitable light source such as a broadband white light source. The source bandwidth should cover the intended operating bandwidth of the color-imaging system. A lens 1802 may be used to collect more light during calibration as shown, but this is not necessary. The incident light 1804 incident on lens 1802 may be incident directly on the pinhole 1806 if lens 1802 is not present. The pinhole 1806 (and lens 1802, if used) is mounted on a XY (XYZ if defocus needs to be calibrated) stage. The stage is stepped in the XY plane and at each location, the diffracted image on the sensor array 1810 is captured. As anyone skilled in the art will notice, the diffracted image will be highly localized to the sensor pixels that are aligned to the center of the pinhole. Thus, the captured image on the sensor array 1810 will be sparse. This data then represents the transfer function of the polychromat-sensor assembly. As described earlier, one can use a variety of techniques to numerically invert the transfer function to obtain the details (color and intensity) of any arbitrary image.

Figure 19:
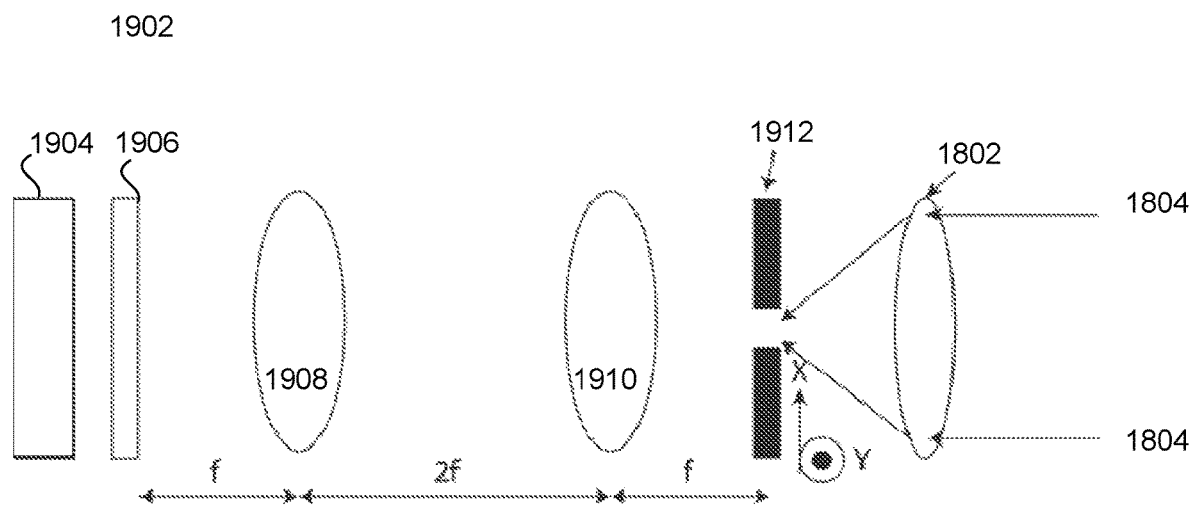
FIG. 19 is a schematic showing an alternative pinhole calibration assembly, which includes one or more focusing optics in accordance with an embodiment of the present invention.

Sometimes it can be difficult to move the pinhole 1806 in close proximity to the polychromat 1808, as shown in FIG. 18. In this case, an image relay system 1902 can be used, as illustrated in FIG. 19, where a 4f system relays the image of the pinhole 1912 onto the polychromat plane 1906. In one embodiment, in the 4f system lenses 1908 and 1910 have a focal length of f and are separated from one another by a length of 2f. Lens 1910 may be separated from pinhole 1912 be a length of f and lens 1908 is separated from the polychromatic plane 1906 by a length of f. Therefore, as depicted, the 4f system has a length of 4f. The lenses 1908 and 1910 in the 4f system are shown as identical in the figure, but this is not required. If their focal lengths are different, there will be resulting magnification or demagnification, which can be advantageous for certain applications. However, this magnification or demagnification factor must be taken into account while doing the inversion of the transfer function, when calculating the image details.

In one configuration, the assembly can be calibrated in a reduced amount of time by using an array of pinholes rather than a single pinhole. The array of pinholes can be a one-dimensional array of pinholes or a two-dimensional array of pinholes. In one example, the spacing between pinholes in the array can be chosen such that the diffracted signal from two closely spaced pinholes (e.g., adjacent pinholes) does not overlap on the sensory array 1904. Then, the array of pinholes can be scanned over an area that is determined by the spacing between the pinholes. After capturing this data, transfer functions from the pinholes in the array can be compiled to obtain calibration data for the assembly. The calibration data can be from an overall field of view of the image-capturing device. Therefore, using the array of pinholes can speed up the calibration process for the assembly.

Figure 20:
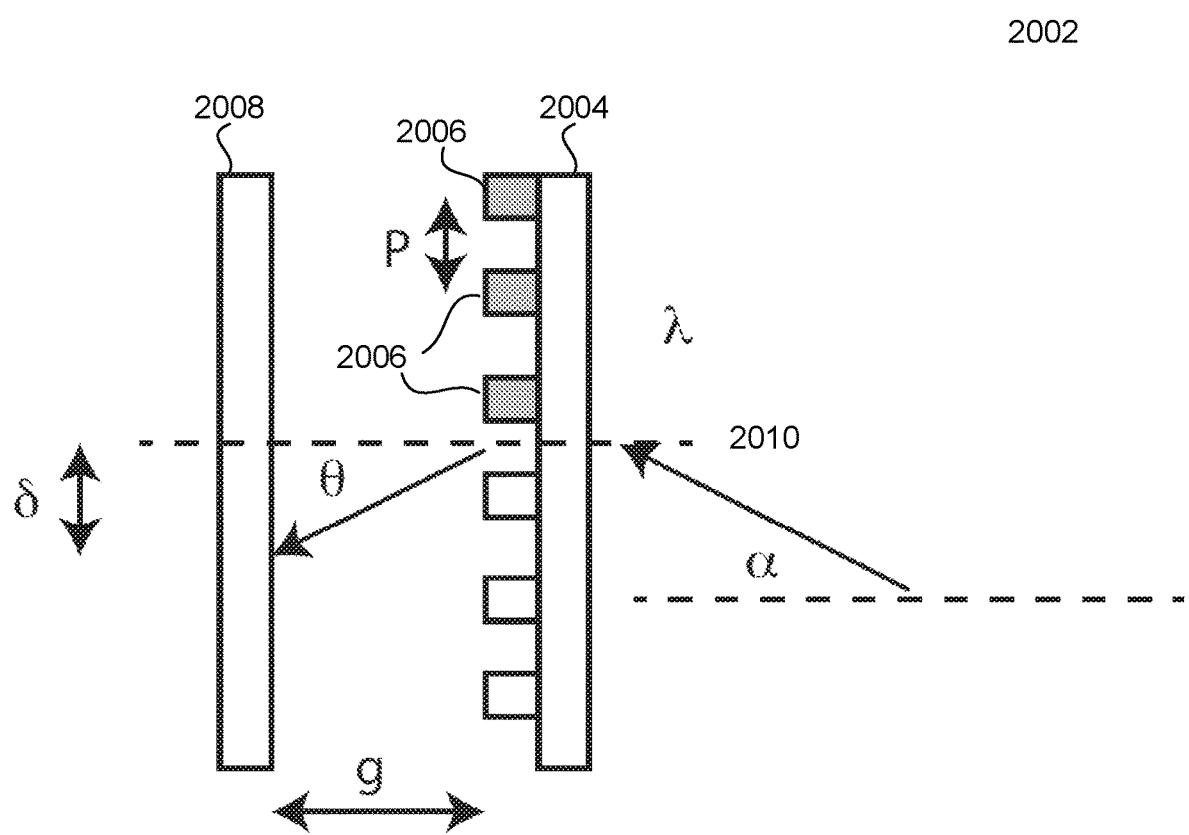
FIG. 20 illustrates an imaging device that includes a diffractive-filter array (DFA) in accordance with an embodiment of the present invention.

FIG. 20 illustrates an exemplary imaging device 2002 that includes a diffractive-filter array (DFA) 2004, which can also be referred to as a super-lattice diffractive-filter array. More specifically, FIG. 20 describes the geometry to calculate the extent of diffractive spreading. In one embodiment, the squares 2006 represent one super-lattice of the DFA 2004. The diffractive-filter array (DFA) 2004 can be designed in a periodic fashion. The super-lattice period can be determined by the maximum extent of the diffractive spreading. The angle of diffraction, $\theta$ is governed by the grating equation as $-\sin(\theta)+\sin(\alpha)=\lambda/P$, where $\lambda$ is the longest wavelength of interest, $\alpha$ is the largest off-axis ray angle and P is two times the size of the DFA pixels.

As a non-limiting example, if $\lambda=750$ nm, $\alpha=30°$ and P=2 µm, then $\theta$ is approximately 7°. As another non-limiting example, if the gap (g)=10 µm, then the diffractive spread, $\delta = \tan(\theta)*g = 1.26$ µm, which is approximately 1 sensor pixel.

In one example, the point-spread function of this DFA 2004 is space variant. In other words, the diffractive pattern is not only dependent upon the wavelength, but also on the location of the sensor pixel on sensor array 2008. The latter is due to the fact that different sensor locations can view different off-axis ray angles. In other words, a (i.e., the largest off-axis ray angle) can change per location of the sensor pixel under consideration. 2010 represents a super lattice boundary.

Figure 21A:
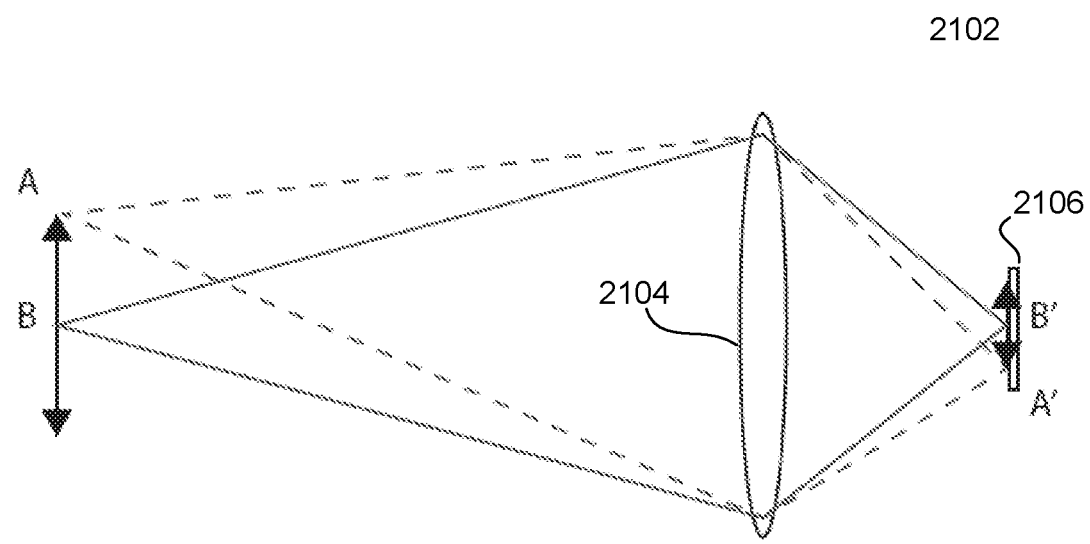
FIG. 21A-D illustrates spatial variancy in a point-spread function (PSF) in accordance with an embodiment of the present invention.

FIG. 21A illustrates an example of an imaging system 2102 with spatial variancy in a point-spread function (PSF). Imaging system 2102 comprises the lens 2104 and the diffractive-filter array (DFA) 2106. FIG. 21A depicts how point A and point B are incident on DFA 2106 as point A' and B' respectively after passing through lens 2104.

Figure 21B:
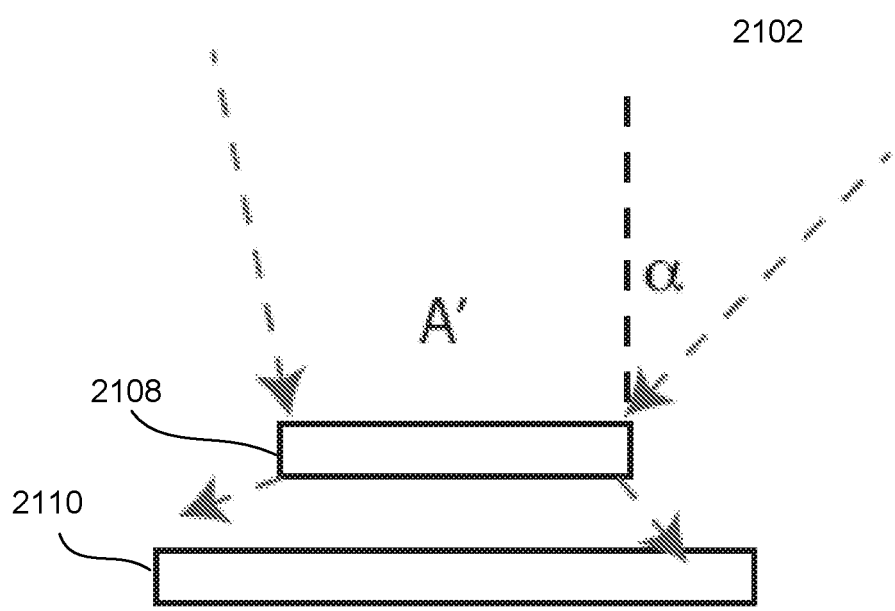
Figure 21C:
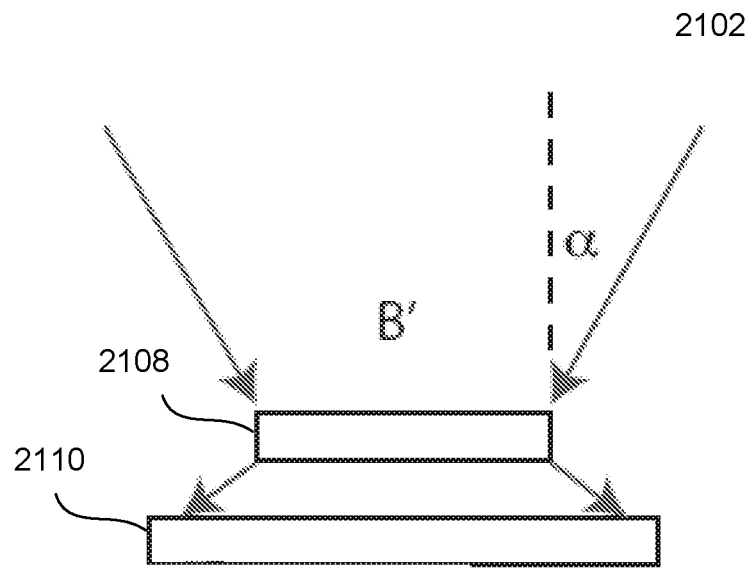

FIG. 21B, illustrates the imaging system 2102 comprising the DFA 2108 and the sensor 2110 where the angle $\alpha$ is depicted with a location for A' for a given sensor pixel. FIG. 21C illustrates how angle $\alpha$ has changed relative to A' per location of the sensor pixel B' under consideration, and off-axis rays can skew the diffraction pattern. The PSF can be calibrated and stored as a function of the location of the sensor pixel (x,y), as well as the object information (x',y', $\lambda$).

Figure 21D:
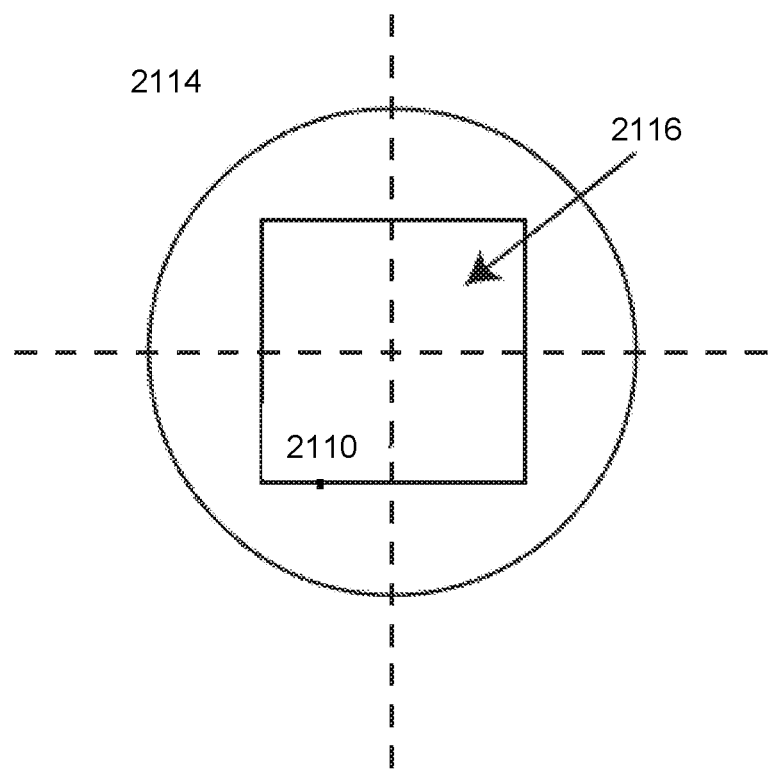

As illustrated in FIG. 21D, symmetry 2116 in the optical system 2114 and sensor 2110 can result in a reduced amount of PSF data. Symmetry principles can be applied to reduce the amount of data. Most optical systems are rotationally symmetric and the sensor pixel itself has rectangular symmetry. Therefore, the amount of stored PSF data can be reduced (e.g., by a fourth). In addition, if the DFA 2108 is periodic based on a super-lattice, the PSF can be calibrated for the center object point. Then, for any other point, the diffracted pattern can be skewed (or rotated) according to the location of the point and the design of the optical system 2114, which can be computed in real-time rather than storing the entire data, thereby resulting in significantly less amount of data that needs to be stored. Thus, the PSF can be calculated as a function of a sensor pixel location and object information.

Figure 22A:
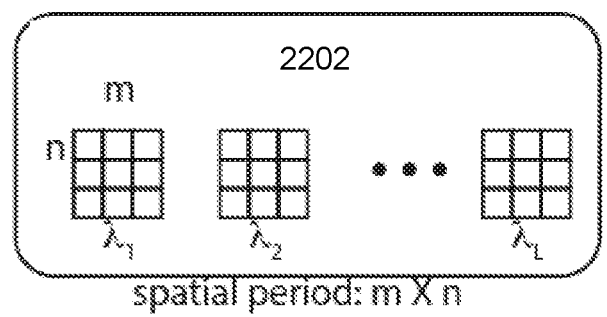
FIG. 22A-C illustrates a technique for computing a multi-spectral image or hyper-spectral image in accordance with an embodiment of the present invention.
Figure 22B:
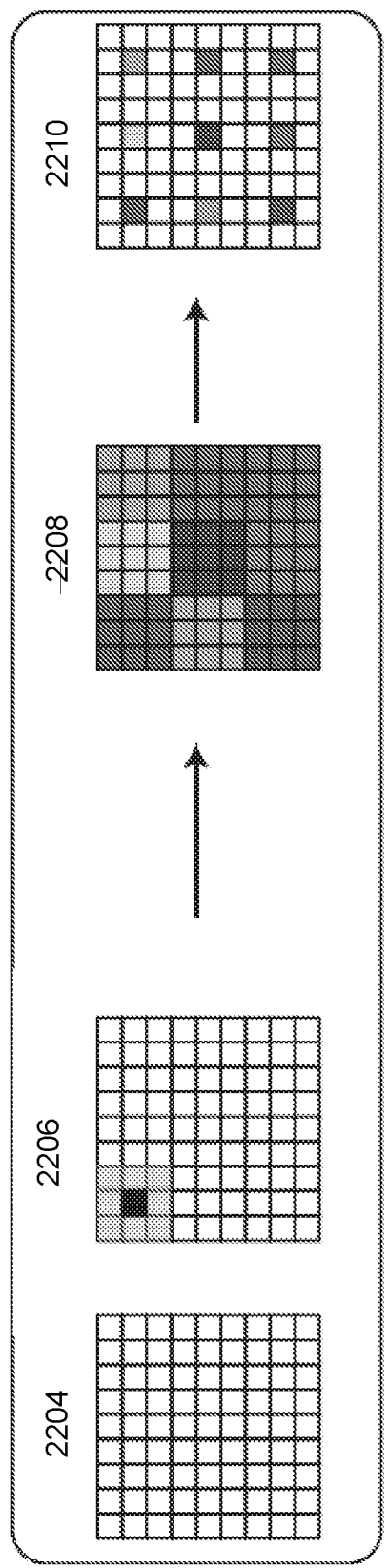
Figure 22C:
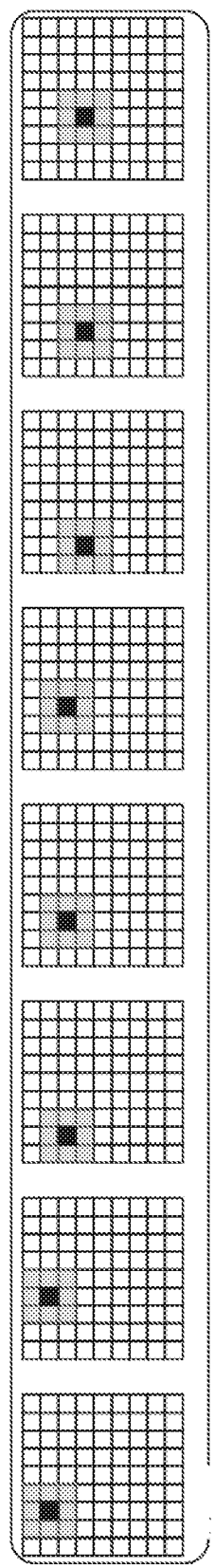

FIG. 22A-C illustrate an exemplary technique for computing a multi-spectral image or hyper-spectral image in a massively parallel fashion for real-time imaging. In this technique, only the non-zero elements of the diffraction pattern can be considered at a time. For each sensor pixel (which corresponds to a specific object pixel as in a conventional imaging system), there are L PSF 2202 matrices corresponding to L wavelengths, as illustrated in FIG. 22A. Only the non-zero elements of the PSF matrix (determined by the diffraction extent) and defined by the size m×n is used. In the illustration, m=n=3, but these are merely non-limiting examples. In some cases, m and n can be non-equal values. As shown in FIG. 22B, the sensor pixels 2204 and the extent of the spread is indicated on the sensor pixel array 2206 in gray and the subject sensor pixel is shown in black.

As a first step 2208, the color within the m×n sensor pixel can be constant. The linear system of equations for the central pixel (shown in black) is defined as: I=O*P, where I is the measured image of size (m×n), O is the object point corresponding to that sensor pixel and is of size (1×L), and P is the PSF matrix of size (L×m×n). The linear system can be solved independent of the neighboring pixels, as shown in FIG. 22B. The linear system can be solved in m*n>=L. If the equality holds, the matrices are square and of sufficient rank. In principle, all the independent linear systems of equations across the entire sensor can be solved in this manner. As described earlier, the PSF matrix changes for each sensor pixel under consideration (shown in black), as illustrated in FIGS. 21A-D. The resulting representative image is plotted on 2210 of FIG. 22B. As shown in FIG. 22C, this process is then repeated for each sensor pixel within the m×n ensemble with appropriate shifting of the super-lattice boundaries (assuming periodic boundary conditions for the PSF) and appropriate adjustments of the PSF (assuming the change in input cone angles). In each case, an image similar to that shown on the right in FIG. 22B is obtained. By combining all these m×n×L images, the full multi- or hyperspectral image can be obtained.

In one example, the proximity effects of neighboring pixels can be accounted for. One approach is to use the combined image as the initial condition for a nonlinear optimization, such as a direct-binary search. This last step can be performed offline (e.g., in non-real time).

FIG. 23A-F illustrates an exemplary technique for identifying measurements to increase a rank of a point-spread function (PSF) matrix during an image reconstruction process. In one example, the image reconstruction process can be improved by using active imaging elements. For example, in order to simplify the image reconstruction process the rank of the PSF matrix can be increased. This can be achieved by obtaining more measurements. A variety of techniques can be applied to achieve this, as illustrated in FIG. 23. As shown in FIG. 23, each of the techniques can involve making the number of measurements (equations) equal to the number of unknowns.

Figure 23A:
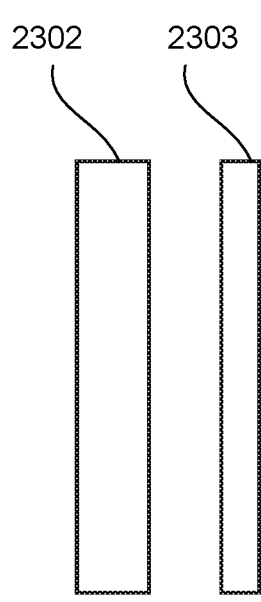
FIG. 23A-F illustrates a technique for identifying measurements to increase a rank of a point-spread function (PSF) matrix during an image reconstruction process in accordance with an embodiment of the present invention.

As shown in FIG. 23A, a liquid-crystal (LC) cell 2303 is used instead of a fabricated DFA and is used in conjunction with a sensor 2302. The LC cell 2303 introduces electrically controlled phase shifts in a pixelated manner. Therefore, L different phase patterns can be created, and L different images on the sensor array can be captured. Then, the total number of measurements becomes M×N×L, where M×N is the total size of the sensor. Now, the number of equations (M×N×L) becomes equal to the number of unknowns (M×N×L) and this linear system can be solved.

Figure 23B:
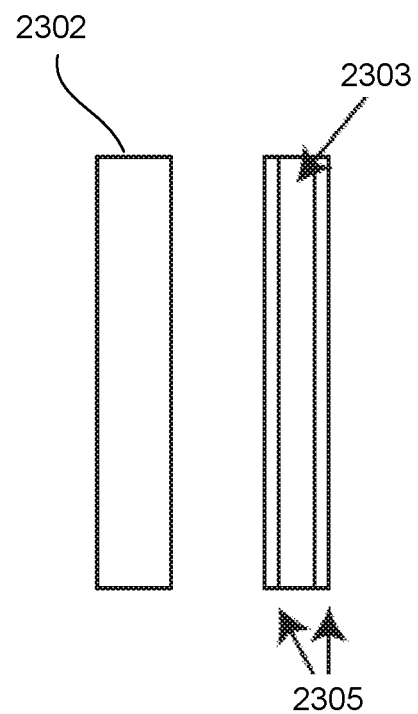

FIG. 23B illustrates an example where the multiple measurements can be achieved using amplitude modulation by placing crossed linear polarizers 2305 on both sides of the LC cell 2303. This technique can be similar to a conventional LC display. However, in this case, some light is lost due to the low transmission of the polarizers 2305.

Figure 23C:
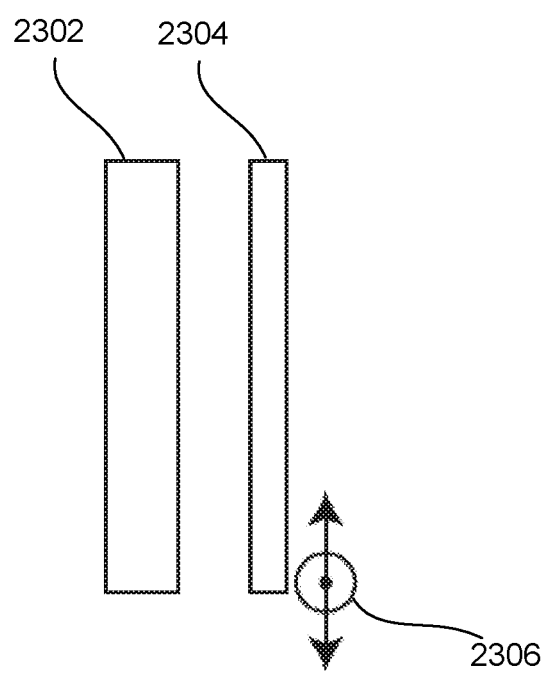

FIG. 23C illustrates an example where, multiple measurements can be obtained by translating the DFA 2304 in X and Y 2306. The translation can be sub-pixel or super-pixel in size. The translation can also be in the form of a fast vibration.

Figure 23D:
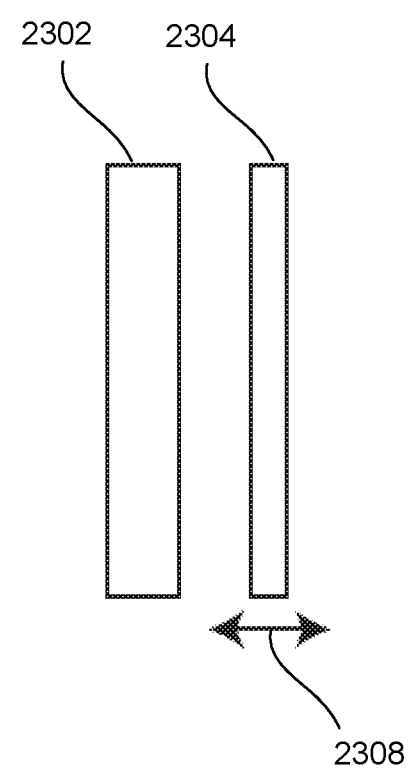
Figure 23E:
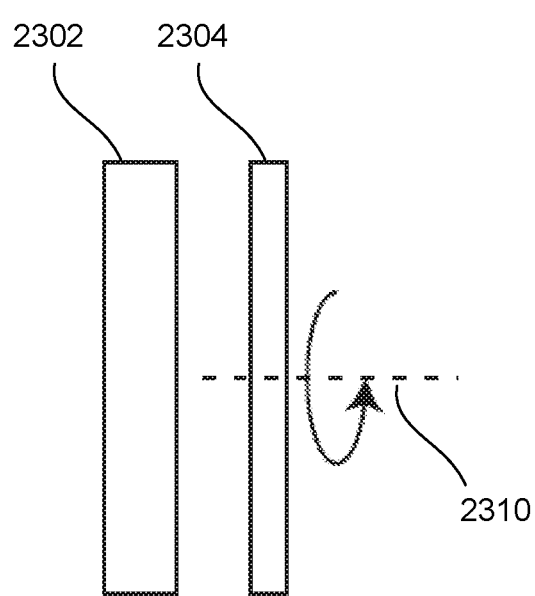
Figure 23F:
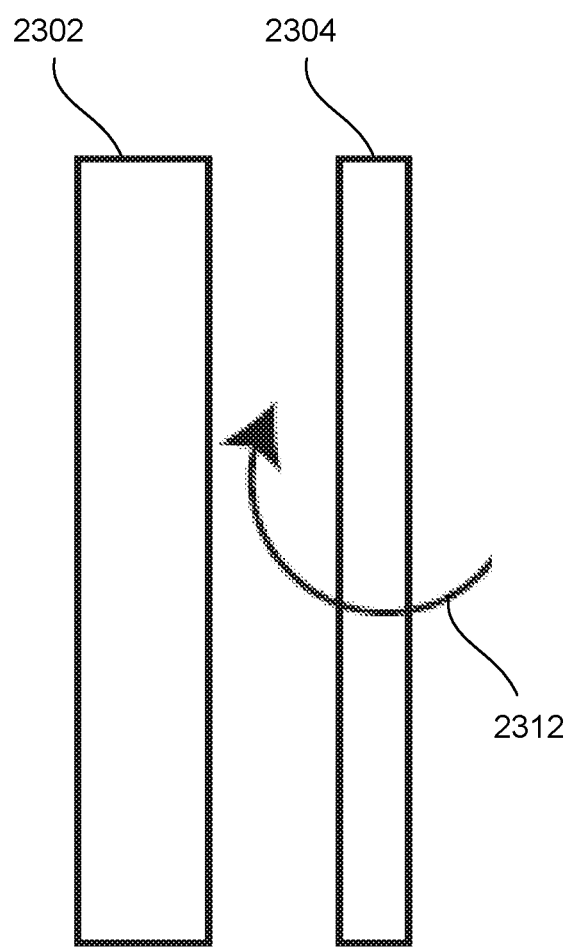

FIG. 23D illustrates an example where multiple measurements can be obtained by translating the DFA 2304 in the Z direction 2308 (along the optical axis). The defocus changes the diffraction pattern and therefore allows one to make L unique measurements for each frame. FIG. 23E illustrates an example where the DFA 2304 is rotated about the longitudinal axis 2310 to obtain the multiple measurements. FIG. 23F illustrates an example where the DFA 2304 is rotated about the transverse axis 2312 (to obtain the multiple measurements. In all these cases, the PSF data can be stored for each of the L configurations that are used for measurements. In addition, symmetry and computation can be used to reduce the amount of data.

EXAMPLE

An imaging capture device was constructed as generally shown in FIG. 2A. FIG. 24A illustrates a schematic view of a portion of the diffractive filter 2402 and sensor array 2404. The diffractive filter has features of width 3 µm and period of 18 µm (i.e. per pixel sub-unit). A monochrome CMOS sensor array 2404 had a pixel size of 6 µm. FIG. 24B are micrographs of the fabricated diffractive filter. Oblique illumination was applied to enhance contrast (insets are images with larger magnifications). FIG. 24C is an atomic-force micrography of a portion of the diffractive element in FIG. 24B delimited by the black box. The structure has maximum pixel height of 1.2 µm and is a multi-level pixel height element. Pixel size of 3 µm is labeled and one period (i.e. sub-unit) is enclosed by the white dashed box. The diffractive element was formed of a transparent dielectric material (Shipley 1813 photoresist) coated on a fused silica substrate via gray-scale lithography. A commercial lens (MVL12WA, Thorlabs) was placed in front of the diffractive filter.

The system was calibrated using a pinhole system stepped along a grid with a tunable bandpass filter to select illumination wavelengths. Calibration only needs to be performed once and can be used for any image reconstructions using the same system.

With this system computational refocusing and extension to 3D multi-spectral imaging can be achieved. The multi-spectral PSFs was measured at various planes that were displaced from the in-focus object plane, similar to measuring the depth-of-field. Then, a multi-spectral object was imaged at a plane that was shifted by 20 mm from the in-focus object plane. As expected, the multi-spectral image computed using in-focus PSF data is distorted with significant color errors and noise. However, the correct multi-spectral image can be computationally obtained by simply using the PSF data from the defocus plane (+20 mm). Thus, this system can be used for generating 3D multi-spectral images by calibrating the 3D space with the multi-spectral PSF data.

Thus, computational multi-spectral video imaging is provided that preserves both spectral and spatial resolution by simply placing a diffractive filter atop the conventional sensor array, and applying linear reconstruction algorithms. The system exhibits a spatial and spectrally variant PSF, where each multi-spectral object point $(x,y,\lambda)$ is mapped to a set of sensor pixels $(x',y')$. This one-to-many mapping can be inverted via regularization, since it is a linear transfer function. The inversion process allows computation of the multi-spectral image. A demonstrated spectral resolution of 9.6 nm and spatial resolution of 4.2 cycles/mm, which is higher than that can be achieved with the conventional camera is also shown.

Since this diffractive filter does not absorb any light, the sensor utilizes all incoming photons. This is in contrast to the conventional color camera, where on an average, $\frac{2}{3}^{rds}$ of the light is unused due to absorption in the Bayer filter. By removing the Bayer filter, the CMOS sensor can be fully compatible with the silicon fabrication process that is widespread in electronics. Further, computational 3D multi-spectral imaging can be achieved with the extension to the computational acquisition of the multi-spectral lightfield. This technology is equally applicable to any portion of the electromagnetic regime as long as the sensor array demonstrates sufficient sensitivity.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An image capturing device, comprising:
a sensor array;
a lens positioned at a first distance from an intermediate image; and
a polychromat positioned at a second distance from the lens, the polychromat being patterned with pixels having varied physical heights designed to diffract the intermediate image according to a transform function to produce a dispersed sensor image onto the sensor array, the dispersed sensor image representing a spatial code of the intermediate image, wherein there is no imaging lens between the sensor array and the polychromat such that the first distance is greater than the second distance, wherein the polychromat is substantially free from blocking light such that all or nearly all light passes through the polychromat onto the sensor image array.

2. The image capturing device of claim 1, wherein the spatial code is a spatial intensity representation of at least one of wavelength and color.

3. The image capturing device of claim 1, wherein the intermediate image is a color image.

4. The image capturing device of claim 1, wherein the intermediate image is represented as $o(x',y',\lambda)$ and the sensor image is represented as $I(x,y)$, wherein $(x',y')$ are spatial coordinates of the intermediate image, $\lambda$ is a wavelength, and $(x,y)$ are spatial coordinates of the sensor array.

5. The image capturing device of claim 1, wherein the transform function is a real space transform.

6. The image capturing device of claim 1, wherein the transform function is a Fourier transform.

7. The image capturing device of claim 1, wherein the transform function is a scalar Fresnel-Kirchoff diffraction equation.

8. The image capturing device of claim 1, wherein the transform function is a rigorous light propagation function based on Maxwell's equations.

9. The image capturing device of claim 1, wherein the transform function from the intermediate image to the sensor array is represented as $P(x,y; x',y', \lambda)$, wherein $(x',y')$ are spatial coordinates of the intermediate image, $(x,y)$ are spatial coordinates of the sensor array, and $\lambda$ is a wavelength.

10. The image capturing device of claim 9, wherein the transform function is calibrated in order to reconstruct the intermediate image.

11. The image capturing device of claim 1, wherein the sensor image is represented as $I(x,y)=O(x',y',\lambda) \cdot P(x,y; x'y', \lambda)=\Sigma a_{m,n,k} P(x,y; x'_m, y'_m, \lambda_k)$, wherein $O(x',y',\lambda)$ represents the intermediate image, $P(x,y; x',y',\lambda)$ represents a transform function from the intermediate image to the sensor array, $a_{m,n,k}$ are unknown values of the intermediate image at coordinates $(x'_m, y'_m, \lambda_k)$.

12. The image capturing device of claim 1, wherein the first distance is equal to a front-focal length of the lens.

13. The image capturing device of claim 1, wherein the second distance is equal to a back-focal length of the lens.

14. The image capturing device of claim 1, wherein the image capturing device does not include an absorptive color filter for producing the sensor image.

15. The image capturing device of claim 1, wherein imaging is performed using multiple wavelengths or with multiple spectral bands.

16. The image capturing device of claim 1, wherein the polychromat is a patterned and transparent or semi-transparent substrate.

17. The image capturing device of claim 1, further comprising a pinhole calibration assembly including a translatable pinhole element oriented between the lens and the sensor array.

18. The image capturing device of claim 17, wherein the pinhole calibration assembly further comprises at least one calibration lens oriented between the translatable pinhole element and the polychromat.

19. The image capturing device of claim 1, wherein the polychromat is a multi-level or binary diffractive element.

20. The image capturing device of claim 1, further comprising a pinhole calibration assembly including an array of translatable pinhole elements oriented between the lens and the sensor array.

21. The image capturing device of claim 20, wherein a spacing between translatable pinhole elements in the array is selected such that a diffracted signal between two adjacent translatable pinhole elements does not overlap on the sensory array.

22. The image capturing device of claim 1, further comprising a diffractive-filter array (DFA) for use in calculating a level of diffractive spreading, wherein a point-spread function (PSF) of the DFA is space variant, wherein the DFA is periodic based on a super-lattice.

23. The image capturing device of claim 22, wherein the PSF is calculated as a function of a sensor pixel location and object information.

24. The image capturing device of claim 22, wherein a multi-spectral image or a hyper-spectral image is computed based on non-zero elements of a diffraction pattern.

25. The image capturing device of claim 22, wherein image reconstruction is performed by taking additional measurements to increase a rank of a PSF matrix.

26. The image capturing device of claim 1, wherein the polychromat is configured with a diffractive structure having sub-units where the sub-units have a repeating periodicity that is larger than a shortest wavelength of infrared light and shorter than a longest wavelength of visible light.

27. The image capturing device of claim 1, wherein each sensor pixel in the sensor array represents a distinct spatial pixel for a color image.

28. A component for an image capturing device, comprising:
a polychromat positioned at a second distance from a lens, the polychromat being patterned with pixels having varied physical heights designed to diffract an intermediate image according to a transform function to produce a dispersed sensor image onto a sensor array, the dispersed sensor image representing a spatial code of the intermediate image, wherein there is no imaging lens between the sensor array and the polychromat such that a first distance between the intermediate image and a lens is greater than the second distance, wherein the polychromat is substantially free from blocking light such that all or nearly all light passes through the polychromat onto the sensor image array.

* * * * *